US011138976B1

(12) United States Patent
Bailey et al.

(10) Patent No.: US 11,138,976 B1
(45) Date of Patent: Oct. 5, 2021

(54) AUTOMATIC MEDIA DEVICE INPUT SCROLLING

(71) Applicant: Amazon Technologies, Inc., Seattle, WA (US)

(72) Inventors: Samuel Thomas Bailey, Seattle, WA (US); Bernardo De Carvalho e Silva, Seattle, WA (US); Mirosla Nadj, Berlin (DE); Damjan Majstorovic, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 193 days.

(21) Appl. No.: 16/588,702

(22) Filed: Sep. 30, 2019

(51) Int. Cl.
*G10L 15/22* (2006.01)
*G10L 17/02* (2013.01)
*G10L 15/28* (2013.01)
*G06F 3/16* (2006.01)

(52) U.S. Cl.
CPC .............. *G10L 15/22* (2013.01); *G06F 3/162* (2013.01); *G10L 15/28* (2013.01); *G10L 2015/223* (2013.01)

(58) Field of Classification Search
CPC ...... G09G 5/006; G09G 2370/12; G09G 5/14; H04N 21/43635
USPC .................................................. 704/231, 246
See application file for complete search history.

(56) References Cited

U.S. PATENT DOCUMENTS

2018/0316876 A1* 11/2018 Gopinath ........... H04N 21/4122

* cited by examiner

*Primary Examiner* — George C Monikang
(74) *Attorney, Agent, or Firm* — Eversheds Sutherland (US) LLP

(57) ABSTRACT

Devices, systems, and methods are provided for automatic media device input scrolling. The system may receive voice data associated with a first device. The system may determine, based on the voice data, an input of the first device. The system may determine an active input of the first device. The system may determine a number of inputs from the active input to the input. The system may send one or more instructions based on the number of inputs.

20 Claims, 10 Drawing Sheets

AUTOMATIC MEDIA DEVICE INPUT SCROLLING

BACKGROUND

Media devices are interconnected more frequently and communicating in a variety of ways. Media device users may control multiple media devices using commands. However, not all media devices are capable of responding to certain types of commands. A media device user may not be able to cause some media devices to take certain actions without being aware of the operating state or context of media devices. Therefore, control of media devices may be improved.

Figure 1A:
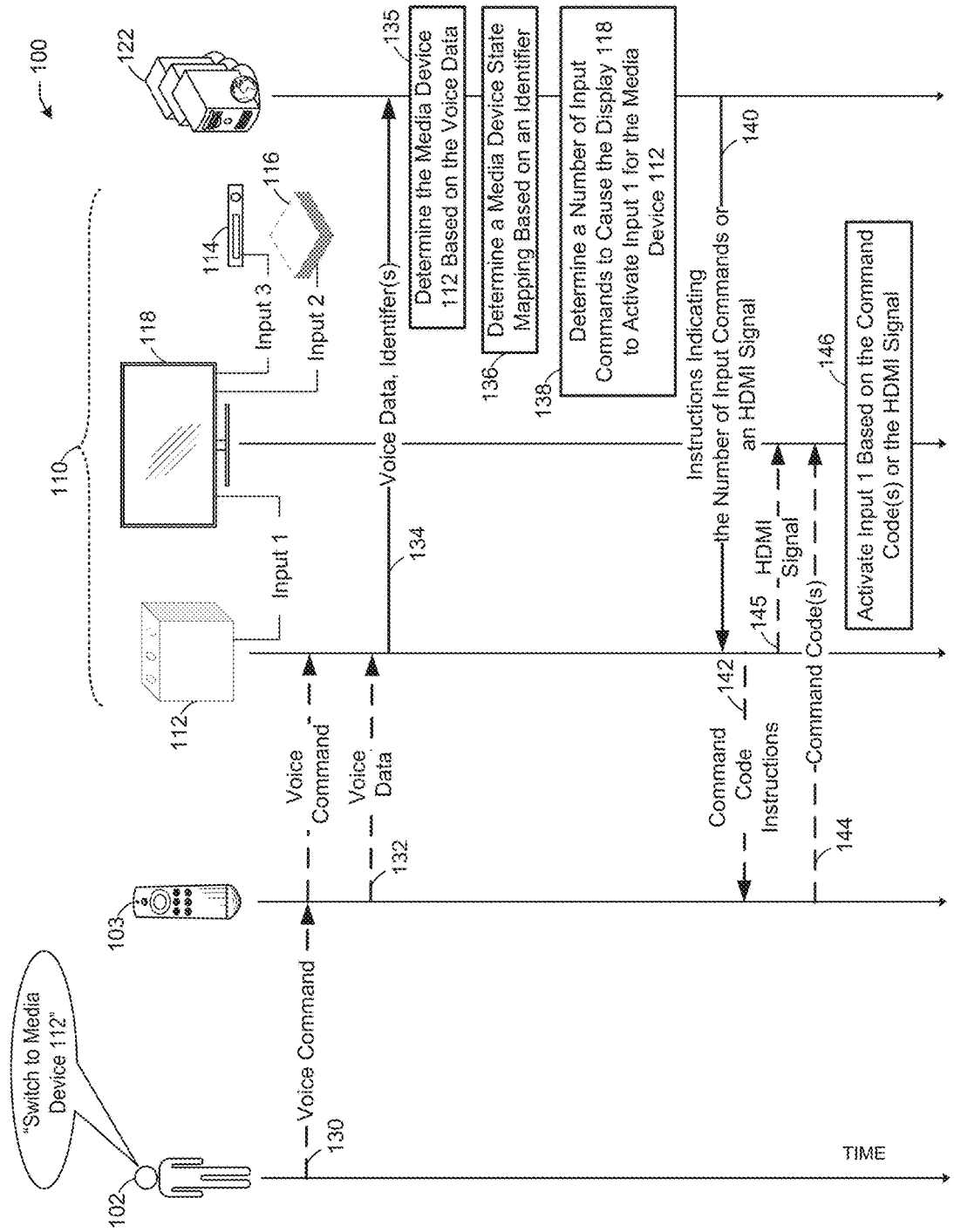
FIG. 1A illustrates an example process for automatic media device input scrolling, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for automatic media device input scrolling.

As media device users increasingly operate media devices of different types, and as media device systems may include multiple interconnected devices (e.g., televisions, receivers, media players, etc.), media device users may benefit from enhanced control of media devices. In particular, some media devices may not respond to discrete infrared or other command codes (e.g., sent from a remote control device). For example, not all televisions may process and respond to discrete input codes (e.g., a separate infrared code for a respective media input, such as high definition multimedia input (HDMI) 1, HDMI 2, RCA, video graphics array (VGA), component, etc.).

An active media input at a device, such as a television or stereo receiver, may refer to the input through which a display (e.g., a television, projector screen, device screen, etc.) receives content that is currently being displayed. Media devices having multiple media inputs may change from one active media input to another media input (e.g., may activate a different media input) by using a list of the media inputs through which the media device may scroll sequentially. For example, a television having a HDMI 1 input, a HDMI 2 input, an antenna input, and a component input, may receive non-discrete input signals (e.g., an infrared code or Wi-Fi signal to switch from one input to another input) which indicate to the television to switch to the next input in the list of inputs (e.g., switch from HDMI 1 to HDMI 2). To cycle through four inputs, the television may require three input signals (e.g., to switch from input 1 to input 2, to switch from input 2 to input 3, and to switch from input 3 to input 4). Such is in contrast with devices which may process discrete input codes which correspond to specific media inputs. For example, a discrete code for HDMI 1 may cause a television to switch to the HDMI 1 input regardless of which input the television is currently active.

Some media devices may allow a user to select (e.g., activate) a particular input from a list of available media inputs. For example, rather than each input signal causing a television to switch to a next respective media input in a list of media inputs, a media input signal received by the television (e.g., from a remote control device) may cause the display of a list of available inputs for the television, and a user may scroll to (e.g., using directional buttons on a remote control) or touch (e.g., using a touch screen) a specific media input. In this manner, a television may switch from one input to another input without having to switch to an intermediate input (e.g., rather than switching from HDMI 1 to HDMI 2 to HDMI 3 sequentially, the television may switch from HDMI 1 to HDMI 3 directly by receiving multiple commands to cause the display of the list of inputs, and then to scroll to or select HDMI 3 as the active input).

Some devices may be controlled using voice commands. For example, a media device user may provide a voice command to switch media inputs or to switch the display to a specific device (e.g., an utterance including "switch to cable box"). Even when a device may determine from a voice command that the media device user has requested a device (e.g., a television or stereo receiver) to activate an input corresponding to the cable box, and when the device may determine which input corresponds to the cable box (e.g., that the cable box is connected to input HDMI 1), the device may not be able to cause the television or receiver to activate the proper input corresponding to the voice command without being aware of which input the television or receiver is currently using (e.g., which input is active), and without being aware of how many non-discrete input command signals to provide to the television or receiver to cause the television or receiver to switch from a currently active media input to the media device user's requested media input. For example, a command to activate an input corresponding to a media player or game console may not be translated into the proper actions at the media device to cause the selection of the input corresponding to the media player or game console.

Therefore, media devices without the ability to process discrete media input signals may benefit from an automatic input scrolling enhancement.

In one or more embodiments, media device systems in which multiple media devices are operatively connected to respective media inputs of one device (e.g., a television, stereo receiver, or other device capable of operatively connecting to multiple media devices through respective media inputs) may benefit from designating a media device input as a center or main input of the multiple media devices. For example, when a television or receiver operatively connects to a cable box, a media player, a game console, and a streaming media device (e.g., a device capable of wirelessly receiving audio and video streams and providing the audio and video streams to the television or receiver), the media input of one of the cable box, media player, game console, or streaming media device (or any other device connected to the television or receiver) may be designated as the center or main input of the media device system.

In one or more embodiments, media device systems may maintain a media state mapping that indicates which particular media devices are connected to respective media inputs of a television or receiver. In one example, the streaming media device may be designated as the center input of a television or receiver at HDMI 2. The television or receiver also may have a cable box operatively connected to HDMI 1, a media player (e.g., a Blu-ray player, DVD player, record player, etc.) operatively connected to HDMI 3, and a game console operatively connected to HDMI 4. Other media devices may be operatively connected to the television or receiver using any type of media input available at the television or receiver, and the media state mapping may indicate which media devices are operatively connected to the television or receiver using which respective media inputs (e.g., the state mapping may indicate that the HDMI 1 media input is used by a cable box, the HDMI 2 input is used by the streaming media device, the HDMI 3 input is used by the media player, and the HDMI 4 input is used by the game console). Using the media state mapping, media device systems may determine the number of media inputs any respective media device is from the media input used by the center input. For example, when the center input is the streaming media device at HDMI 2, the cable box may be one input away at HDMI 1 (or four inputs away at HDMI 1 when the television or receiver may scroll from one media input to another in one direction, such as from HDMI 2 to HDMI 3, from HDMI 3 to HDMI 4, and from HDMI 4 to HDMI 1). The media state mapping may allow a device such as a television or receiver to simulate the ability to receive and process discrete media input commands (e.g., a first command that causes the television to select HDMI 1 regardless of which media input is being used when the command is received, a second command that causes the television to select HDMI 2, etc.).

In one or more embodiments, one or more media devices of a media device system may receive voice commands. For example, a remote control device, streaming media device, or other type of device may receive a voice command to select and render content, to execute media applications (e.g., to initiate a streaming media service application), and to cause a device to select a specific media input corresponding to a particular media device (e.g., "Switch inputs to the cable box."). A remote network (e.g., a cloud-based network) may receive voice commands from a media device, may determine one or more actions corresponding a voice command (e.g., for any combination of devices to execute), and may send instructions to one or more media devices to cause the execution of the actions corresponding to a voice command. The remote network may have access to the media state mapping, which may be provided to the remote network by a media device in a media device system. For example, a media device user may provide a voice command to switch media inputs of a television or receiver (e.g., "Switch inputs to the streaming media device."). The voice command may be detected by a remote control device, sent to a media device (e.g., the streaming media device), and sent from the streaming media device to the remote network. The voice command may be received by another media device (e.g., rather than a remote control device) and sent to the remote network.

In one or more embodiments, the remote network may determine that the voice command corresponds to a request to switch inputs at a television or receiver (e.g., based on which media device in the media state mapping controls the media inputs). Using the media state mapping, the remote network may identify the media input corresponding to the main input and/or to the currently selected media input of the television or stereo, and may determine the number of input command signals to send to the television or stereo to cause the television or stereo to activate the media input corresponding to the media device identified from the voice command. The remote network may send one or more instructions to a media device (e.g., the streaming media device or the other media device) indicating that the television or receiver is to activate the corresponding media input of the streaming media device (e.g., the instructions may specify the specific number of "change input" command signals to send to the television or receiver to cause the television or receiver to scroll to the media input of the media device identified from the voice command). For example, when the television or stereo is on HDMI 1, and the voice command requests the input for a media device operatively connected to HDMI 3, the number of input commands required to move from HDMI 1 to activate HDMI 3 may be two, so the remote network may send instructions to the streaming media device or other device to provide two input command signals (or a different number of signals, such as a first signal to display a list of media inputs, and the number of signals needed to move from the currently selected media input to the requested media input) to the television or receiver. The streaming media device or the other device may send the commands to the television or receiver, or may send signals to a remote control device to send the command (e.g., infrared commands) to the television or receiver.

In one or more embodiments, the remote network may store with the media state mapping an indication of the current media input being used. Therefore, when the remote network receives a voice command to switch media inputs and identifies the requested media input, the remote network may determine, using the media state mapping, the number of commands needed to cause the television or receiver to activate the requested media input (e.g., voice data from the voice command may be sent along with an identifier, such as a medium access control address of the device sending the voice data). The remote network may store or have access to information regarding the television or receiver. The media state mapping may provide an indication of the model or other device identifier (e.g. a medium access control address, an Internet protocol address, etc.) of any media device, and the remote network may identify a media system and corresponding media state mapping based on the media device, along with the type of input commands, input menus/interfaces, etc. used by the television or receiver in the media system. For example, some device models may receive sequential input change commands, causing the device to switch media inputs sequentially with each received command. Some device models may use interfaces or menus which display a list or other representation of available media inputs, and may require an input command to cause the display of such an interface or menu before receiving respective commands to scroll or otherwise move from one media input to another media input. For example, an interface may list HDMI 1-HDMI 4 media inputs, and may require a separate input command to move from HDMI 1 to HDMI 2, from HDMI 2 to HDMI 3, and so on, with a media input being selected when no more input signals are received after a threshold amount of time. Such menus and interfaces may be unidirectional (e.g., may only scroll in one direction, such as HDMI 1 to HDMI 2, HDMI 2 to HDMI 3, HDMI 3 to HDMI 1, etc.), and some may be bidirectional (e.g., a left or up input command may move from HDMI 1 to HDMI 4, while a right or down command may move from HDMI 1 to HDMI 2).

In one or more embodiments, the number of input commands needed to switch from a current media input to a requested media input may depend on the device model and what type of media input interface the device model uses, as determined by the remote network. The remote network may instruct a media device to use the smallest number of input commands required to select a media input. For example, in a bidirectional input interface with media inputs HDMI 1-HDMI 4 and a "wrap-around" ability, to move from HDMI 1 to HDMI 4 may require only one input command to move backward from HDMI 1 to HDMI 4 rather than using three input commands to select HDMI 4. The remote network may instruct a media device to send a certain number of input commands, and in which direction. The media device or a remote control may determine the specific input codes (e.g., infrared codes) to send based on the number and direction of input commands.

In one or more embodiments, the remote network may become out of sync with the state of the television or receiver controlling media inputs. For example, the remote network may store an indication of the current media input used by the television or receiver as HDMI 1 when the television or receiver actually is using HDMI 2. The error may occur because a media device user manually selects a media device input (e.g., on the television or receiver, or with a remote control which does not result in sending a command to the remote network) without the remote network receiving an indication of the selection. Such may result in incorrect instructions provided by the remote network in response to voice commands requesting a switch to a particular media input. The remote network may identify an error, for example, when the remote network receives the same voice command or multiple voice commands specifying the same media input within a threshold amount of time (or repeat commands specifying the same media input). To rectify such state errors and get back in sync with the media devices of a media system, the remote network may send instructions to return to the main media input (e.g., using Consumer Electronics Code one touch play input), and may send additional instructions based on the number of input commands needed to switch from the main media input to the requested media input.

In one or more embodiments, the media state mapping may begin with the main media input. In this manner, the default or home state of the media system may be the main media input. When the remote network receives and responds to a voice command corresponding to a request to switch media inputs, the remote network may update the media state mapping with an indication of the number of media inputs that the television or receiver is at a given time from the main media input, and also may store the direction of the number of inputs from the main media input. In this manner, when the remote network receives a request corresponding to a media input switch from a first media input to a second media input, and neither of the first and second media inputs is the main media input, the remote network may determine the number of media input commands are needed to move from the first media input being active to activate the second media input. When an error is identified, however, the remote network may invalidate the media state mapping by indicating that the television or receiver is in an unknown state, and may update the media state mapping once the remote network confirms the media input currently selected at the television or receiver (e.g., the main media input). In an invalid state, the remote network may send instructions to cause presentation of a request for a media device user to select the main media input, or may request that the media device user provide an indication (e.g., a voice input, a button push, a selection of a media input, etc.) stating which media input is currently selected by the television or receiver. The remote network may set the media mapping state to the media input indicated by the media device user.

In one or more embodiments, when a media device sends a signal to the television or stereo through a respective media input (e.g., through a particular HDMI port), the signal may cause the television or stereo to select or activate the respective media input. To return the media device system to a known state (e.g., to a state corresponding to a selected media input recognized by the remote network), the remote network may send instructions to cause a media device (e.g., the streaming media device) to send a signal to the television or receiver through its respective media input to cause the television or receiver to select the respective media input. In this manner, the remote network may return the television or receiver to the main media input and may confirm when the main media input has been selected (e.g., based on a user confirmation or a signal received using the main media input), and then may update the state mapping.

In one or more embodiments, the remote network may maintain a state machine indicating which media devices are operatively connected to respective media inputs, and the number of media inputs for each respective media input from the main media input (e.g., a state mapping indicating which media devices are operatively connected to a respective media input). For example, HDMI 1 may be one input from HDMI 2, HDMI 3 may be two inputs from HDMI 1, and so on. When the remote network updates the state machine to reflect that a particular media input is selected, the current state may indicate the number of media inputs that the current state is from the main media input. In this manner, the remote network may identify a requested media input, determine a corresponding state of the state machine for the media input, determine the number of media inputs the corresponding state is from the main media input, determine the number of media inputs the current state of the state machine is from the main media input, and may determine the smallest number of input commands needed to switch from the current state to the corresponding state. The instructions sent by the remote network to switch media inputs may be based on such analysis of a state machine.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1A illustrates an example process 100 for automatic media device input scrolling, in accordance with one or more example embodiments of the present disclosure.

Referring to FIG. 1A, the process 100 may include a user 102, a remote control device 103, a media device system 110 (e.g., including one or more media devices such as a streaming media device 112, a cable box 114, a video game device 116, a display 118 (e.g., a television), and any combination of devices capable of receiving, providing, and/or rendering media content such as audio and/or video content), and one or more servers 122. At step 130, the user 102 may utter a voice command, such as "switch to media device 112" (e.g., referring to a particular media device, such as "switch to streaming media device," "switch to cable box," "switch to game console," "select cable box," "select streaming media device" etc.). Either the remote control device 103 or the streaming media device 112 may capture the audio command (e.g., with one or more microphones, not shown). At step 132, when the remote control device 103 captures the voice command at step 130, the remote control device 103 may send voice data (e.g., the recording of the voice command or a representation of the voice command) to another device, such as the streaming media device 112. At step 134, the other device (e.g., the streaming media device 112) may send the voice data and one or more identifiers (e.g., device and/or user identifiers) to the one or more servers 122 for analysis.

Still referring to FIG. 1A, the one or more servers 122 (e.g., cloud-based computers) may determine, at step 135, that the voice data is related to the streaming media device 112. As shown, the voice command may include an utterance of the streaming media device 112, and the one or more servers 122 may identify the streaming media device 112 or any other device uttered in the voice command. When the one or more servers 122 identifies voice data that mentions a media device such as the streaming media device 112, the one or more servers 122 may determine that that a media device system state mapping is needed to translate the voice data into one or more commands. At step 136, the one or more servers 122 may determine a media device state mapping based on one or more identifiers (e.g., a device address of the streaming media device 112 or any device in the media device system 110). For example, the one or more servers 122 may have a state machine which indicates the media devices of the media device system 110, including which media devices are operatively connected to the display 118, and to which inputs (e.g., input 1, input 2, input 3, etc., which may refer to HDMI input ports, RCA input ports, VGA input ports, component input ports, or any other type of input ports). The one or more servers 122 may identify the state mapping by identifying the user 102 from the voice data, by identifying the state mapping based on an indication of the user 102, an indication of a user account of the user 102, and/or an indication of any device in the media device system 110. The one or more servers 122 may update the state mapping any time that an input changes in the media device system 110, and the state machine may indicate the number of inputs that a current (e.g., active) input and any other media device in the media device system 110 are from a main input (e.g., from input 1, corresponding to a main device such as the streaming media device 112). At step 138, the one or more servers 122 may determine a number of input commands needed to cause the display 118 to activate input 1 for the streaming media device 112 (e.g., when the voice command indicates a request to activate the input corresponding to the streaming media device 112 at the display 118). To determine the number of input commands, the one or more servers 122 may use the state mapping, which may indicate that a current state of the media device system 110 uses the current input (e.g., input 3 of the cable box 114), that the main input is input 1, that the difference between the main input and the requested input is zero (e.g., the main input and the requested input are input 1 for the streaming media device 112), that the difference between the current input and the main input is two (e.g., from input 3 to input 1 is two inputs), and that to switch to input 1 from input 3 requires two input commands based on the relative positions of the requested input and the current input from the main input.

Still referring to FIG. 1A, at step 140, the one or more servers 122 may send instructions, including the number of input commands and/or an HDMI signal (e.g., a Consumer Electronics Code signal when the requested input corresponds to the streaming media device 112 and when the display 118 has Consumer Electronics Code capability), to the media device system 110 (e.g., to the streaming media device 112). At step 142, the streaming media device 112 may determine command code instructions corresponding to the number of command inputs. For example, the streaming media device 112 may determine and send the command codes (e.g., infrared or other signals) that the remote control device 103 may send to cause the display 118 to select the requested input corresponding to the voice command. The remote control device 103, at step 144, may send the command codes to the media device system 110 (e.g., to the display 118). When the voice data is indicative of a selection of the media input (e.g., input 1) corresponding to the streaming media device 112, rather than sending the command code instructions at step 142, the streaming media device 112 may, at step 145, send an HDMI signal (e.g., a Consumer Electronics Code one touch play input) to the display 118. A Consumer Electronics Code (CEC) one touch play code may be a signal sent through the input 1 port (e.g., an HDMI input port), and which indicates to the display 118 that input 1 is to be activated. At step 146, the display 118 may activate the input corresponding to the voice command (e.g., input 1 for the streaming media device 112). As described below in FIG. 2A and FIG. 2B, activation may include scrolling to input 1 from the currently active input.

Figure 1B:
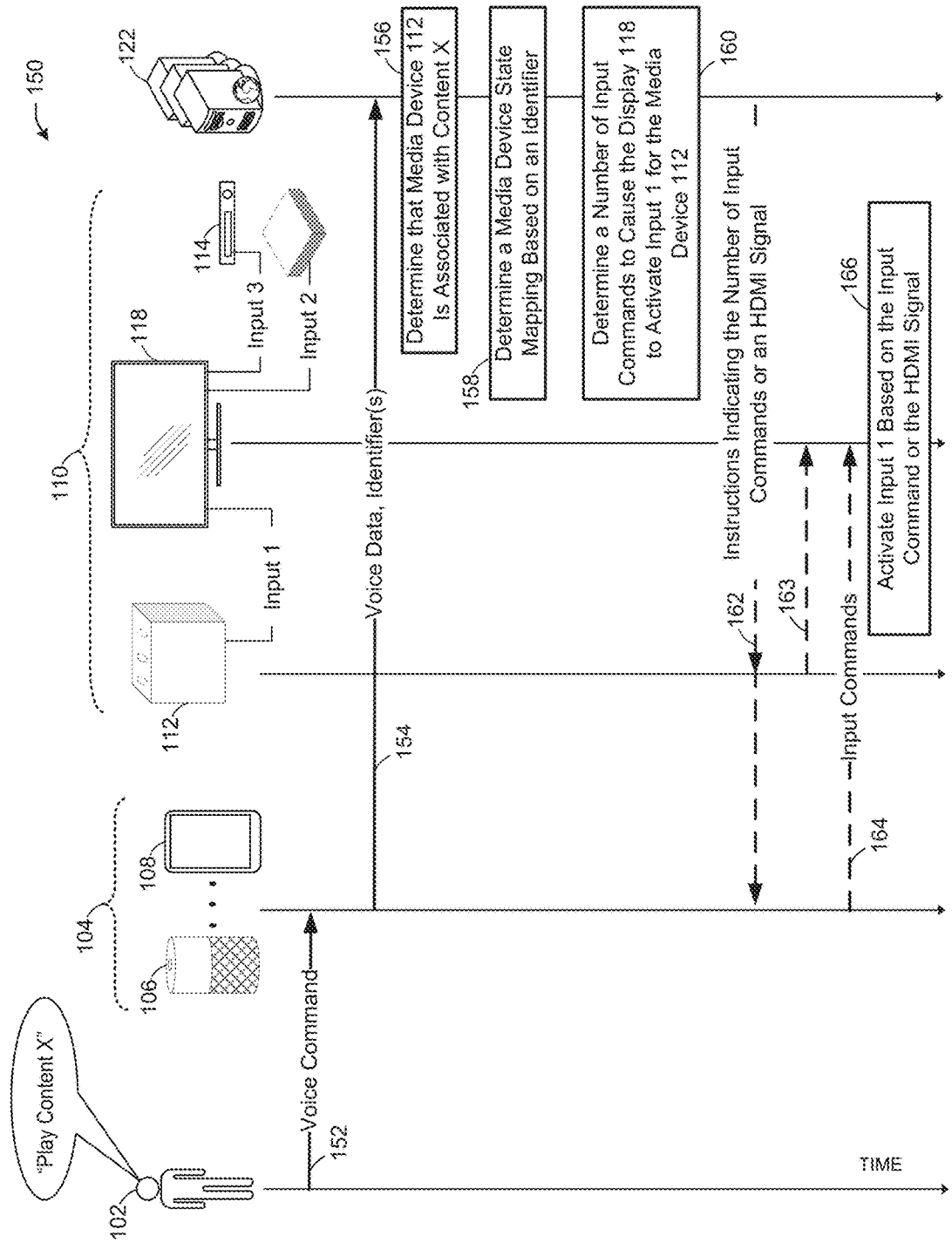
FIG. 1B illustrates an example process for automatic media device input scrolling, in accordance with one or more example embodiments of the present disclosure.

FIG. 1B illustrates an example process 150 for automatic media device input scrolling, in accordance with one or more example embodiments of the present disclosure.

Referring to FIG. 1B, the process 150 may include the user 102, one or more voice command-enabled devices 104 (e.g., device 106, device 108), the media device system 110 (e.g., including one or more media devices such as the streaming media device 112, the cable box 114, the video game device 116, the display 118 (e.g., a television), and any combination of devices capable of receiving, providing, and/or rendering media content such as audio and/or video content), and the one or more servers 122. At step 152, the user 102 may utter a voice command, such as "Play Content X" (e.g., the voice command may not specify an input or device). The one or more voice command-enabled devices 104 may capture the audio command (e.g., with one or more microphones, not shown). At step 154, the one or more voice command-enabled devices 104 may send voice data (e.g., the recording of the voice command or a representation of the voice command) and one or more identifiers (e.g., device identifiers and/or user identifiers) to the one or more servers 122 for analysis. At step 156, the one or more servers 122 may determine that a media device of the media device system 110 (e.g., the streaming media device 112) is associated with content X (e.g., the streaming media device 112 may facilitate playback of content X). The one or more servers 122 may identify the requested content (e.g., content X), and may determine whether the streaming media device 112 or any other device in the media device system 110 may facilitate playback of the requested content (e.g., the one or more servers 122 may have access to content libraries for any of the media devices of the media device system 110).

Still referring to FIG. 1B, the one or more servers 122 (e.g., cloud-based computers) may determine, at step 158, a media device state mapping. The one or more identifiers may be used to find the state mapping for the media device system 110. When the one or more identifiers includes a medium access control (MAC) address for the one or more voice command-enabled devices 104 or for the streaming media device 112, the one or more servers 122 may identify a corresponding state mapping for the media device system 110. For example, the one or more servers 122 may have a state machine which indicates the media devices of the media device system 110, including which media devices are operatively connected to the display 118, and to which inputs (e.g., input 1, input 2, input 3, etc. which may refer to HDMI input ports, RCA input ports, VGA input ports, component input ports, or any other type of input ports). The one or more servers 122 may identify the state mapping by identifying the user 102 from the voice data, by identifying the state mapping based on an indication of the user 102, an indication of a user account of the user 102, and/or an indication of any device in the media device system 110. The one or more servers 122 may update the state mapping any time that an input changes in the media device system 110, and the state machine may indicate the number of inputs that a current input and any other media device in the media device system 110 are from a main input (e.g., from input 1, corresponding to a main device such as the streaming media device 112). At step 160, the one or more servers 122 may determine a number of input commands needed to cause the display 118 to select input 1 for the streaming media device 112 (e.g., when the voice command indicates a request to select the input corresponding to the streaming media device 112 at the display 118). To determine the number of input commands, the one or more servers 122 may use the state mapping, which may indicate that a current state of the media device system 110 uses the current input (e.g., input 3 of the cable box 114), that the main input is input 1, that the difference between the main input and the requested input is zero (e.g., the main input and the requested input are input 1 for the streaming media device 112), that the difference between the current input and the main input is two (e.g., from input 3 to input 1 is two inputs), and that to switch to input 1 from input 3 requires two input commands based on the relative positions of the requested input and the current input from the main input.

Still referring to FIG. 1B, at step 162, the one or more servers 122 may send instructions, including the number of input commands and/or a CEC one touch play HDMI signal, to the one or more voice command-enabled devices 104 or to the streaming media device 112. At step 163, when the instructions are sent to the streaming media device 112 at step 162, the streaming media device 112 may send the instructions (e.g., via one or more Wi-Fi, Bluetooth, or other wireless signals) to the display 118. When the one or more voice command-enabled devices 104 may receive the instructions at step 162, the one or more voice command-enabled devices 104, at step 164, may send the number of input commands (e.g., infrared or other types of command codes) to the media device system 110 (e.g., to the display 118). A step 166, the display 118 may activate the input corresponding to the voice command (e.g., input 1 for the streaming media device 112).

Referring to FIG. 1A and FIG. 1B, at step 138 and step 160, the one or more servers may rely on a state mapping to determine the number of input commands needed to cause a media device of the media device system 110 to select an input that corresponds with a device identified based on a voice command. In one example, the streaming media device 112 may be designated as the center input of a television or receiver at HDMI 1 (e.g., input 1). The display 118 also may have the cable box 114 operatively connected to HDMI 3, and the video game device 116 (e.g., a game console) operatively connected to HDMI 2. Other media devices may be operatively connected to the display 118 using any type of media input available at the display 118, and the media state mapping may indicate which media devices are operatively connected to the display 118 using which respective media inputs (e.g., the state mapping may indicate that input 1 is used by the streaming media device 112, input 2 is used by the video game device 116, and input 3 is used by the cable box 114). Using the media state mapping, the one or more servers 122 may determine the number of media inputs a voice-requested media device is from the media input used by the center input (e.g., input 1). For example, when the center input is the streaming media device 112 at input 1, the cable box 114 may be two inputs away at HDMI 3 (e.g., when the display 118 may scroll from input 1 to input 3 by "wrapping around" rather than sequentially scrolling in only one direction).

In one or more embodiments, the one or more servers 122 may determine that the voice command corresponds to a request to activate an input at the display 118 (e.g., based on which media device in the media state mapping controls the media inputs). Using the media state mapping, the one or more servers 122 may identify the media input corresponding to the main input and/or to the currently selected media input of the display 118, and may determine the number of input command signals to send to the display 118 to cause the display 118 to activate the media input corresponding to the media device identified from the voice command. The one or more servers 122 may send one or more instructions to a media device (e.g., the streaming media device 112 or the other media device) indicating that the display 118 is to switch media inputs to activate the corresponding media input of the streaming media device 112 (e.g., the instructions may specify the specific number of "change input" signals to send to the display 118 to cause the display 118 to select the media input of the media device identified from the voice command. For example, when the display 118 is on HDMI 1 (e.g., HDMI 1 is active), and the voice command requests the input for a media device operatively connected to HDMI 3, the number of input commands required to scroll from HDMI 1 to HDMI 3 may be two, so the one or more servers 122 may send instructions to the streaming media device 112 or other device (e.g., the one or more devices 104) to provide two input command signals (or a different number of signals, such as a first signal to display a list of media inputs, and the number of signals needed to move from the currently selected media input to the requested media input) to the display 118. The streaming media device 112 or the other device (e.g., the one or more devices 104) may send the commands to the display 118 (e.g., as shown in FIG. 1B), or may send signals to the remote control device 103 to send the command (e.g., infrared commands) to the display 118 (e.g., as shown in FIG. 1A).

In one or more embodiments, the one or more servers 122 may store with the media state mapping an indication of the current media input being used (e.g., the active media input). Therefore, when the one or more servers 122 receives a voice command to switch media inputs and identifies the requested media input, the one or more servers 122 may determine, using the media state mapping, the number of commands needed to cause the display 118 to activate the requested media input. The one or more servers 122 may store or have access to information regarding the display 118. The media state mapping may provide an indication of the model or other device identifier of any media device, such as the streaming media device 112, and the one or more servers 122 may identify the type of input commands, input menus/interfaces, etc. used by the display 118. For example, some device models may receive sequential input change commands, causing the device to switch media inputs sequentially with each received command. Some device models may use interfaces or menus which display a list or other representation of available media inputs, and may require an input command to cause the display of such an interface or menu before receiving respective commands to scroll or otherwise move from one media input to another media input. For example, an interface may list HDMI 1-HDMI 4 media inputs, and may require a separate input command to move from HDMI 1 to HDMI 2, from HDMI 2 to HDMI 3, and so on, with a media input being selected when no more input signals are received after a threshold amount of time. Such menus and interfaces may be unidirectional (e.g., may only scroll in one direction, such as HDMI 1 to HDMI 2, HDMI 2 to HDMI 3, HDMI 3 to HDMI 1, etc.), and some may be bidirectional (e.g., a left or up input command may move from HDMI 1 to HDMI 4, while a right or down command may move from HDMI 1 to HDMI 2).

In one or more embodiments, the number of input commands needed to switch from a current media input to a requested media input may depend on the device model (e.g., of the display 118) and what type of media input interface the device model uses, as determined by the one or more servers 122. The one or more servers 122 may instruct a media device to use the smallest number of input commands required to select a media input. For example, in a bidirectional input interface with media inputs HDMI 1-HDMI 4 and a "wrap-around" ability, to move from HDMI 1 to HDMI 4 may require only one input command to move backward from HDMI 1 to HDMI 4 rather than using three input commands to select HDMI 4. The one or more servers 122 may instruct a media device to send a certain number of input commands, and in which direction. The streaming media device 112, the one or more devices 104, or the remote control device 103 may determine the specific input codes (e.g., infrared codes) to send based on the number and direction of input commands.

In one or more embodiments, the media state mapping may begin with the main media input. In this manner, the default or home state of the media device system 110 may be the main media input. When the one or more servers 122 receives and responds to a voice command corresponding to a request to switch media inputs, the one or more servers 122 may update the media state mapping with an indication of the number of media inputs that the display 118 is at a given time from the main media input, and also may store the direction of the number of inputs from the main media input. In this manner, when the one or more servers 122 receives a request corresponding to a media input switch from a first media input to a second media input, and neither of the first and second media inputs is the main media input, the one or more servers 122 may determine the number of media input commands are needed to move from the first media input to the second media input. When an error is identified, however, the one or more servers 122 may invalidate the media state mapping by indicating that the display 118 is in an unknown state, and may update the media state mapping once the one or more servers 122 confirms the media input currently selected at the display 118 (e.g., the main media input). In an invalid state, the one or more servers 122 may send instructions to cause presentation of a request for a media device user to select the main media input, or may request that the media device user provide an indication (e.g., a voice input, a button push, a selection of a media input, etc.) stating which media input is currently selected by the display 118. The one or more servers 122 may set the media mapping state to the media input indicated by the media device user.

In one or more embodiments, when a media device sends a signal to the display 118 through a respective media input (e.g., through a particular HDMI port), the signal may cause the display 118 to select or activate the respective media input. To return the media device system 110 to a known state (e.g., to a state corresponding to a selected media input recognized by the one or more servers 122), the one or more servers 122 may send instructions to cause a media device (e.g., the streaming media device 112) to send a signal to the display 118 through its respective media input to cause the display 118 to select the respective media input. In this manner, the one or more servers 122 may return the display 118 to the main media input and may confirm when the main media input has been selected (e.g., based on a user confirmation or a signal received using the main media input), and then may update the state mapping.

In one or more embodiments, the one or more servers 122 may maintain a state machine indicating which media devices are operatively connected to respective media inputs, and the number of media inputs for each respective media input from the main media input (e.g., a state mapping indicating which media devices are operatively connected to a respective media input). For example, HDMI 1 may be one input from HDMI 2, HDMI 3 may be two inputs from HDMI 1, and so on. When the one or more servers 122 updates the state machine to reflect that a particular media input is selected, the current state may indicate the number of media inputs that the current state is from the main media input. In this manner, the one or more servers 122 may identify a requested media input, determine a corresponding state of the state machine for the media input, determine the number of media inputs the corresponding state is from the main media input, determine the number of media inputs the current state of the state machine is from the main media input, and may determine the smallest number of input commands needed to switch from the current state to the corresponding state. The instructions sent by the one or more servers 122 to switch media inputs may be based on such analysis of a state machine.

While FIG. 1A and FIG. 1B show the display 118 as controlling the active inputs at the display 118, any of the devices in the media device system 110, including a media receiver (not shown) may control which input is active (e.g., which input provides content displayed at the display 118). For example, when input 1, input 2, and input 3 are media inputs at a stereo receiver which has a media output operatively connected to the display 118, the active media input at the stereo receiver may provide content rendered at the display 118.

In one or more embodiments, the remote control device 103, the one or more voice command-enabled devices 104, devices of the media device system 110, and/or the one or more servers 122 may include a personal computer (PC), a smart home device, a device with one or more speakers or other audio outputs, a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list. The one or more servers 122 may include a remote network (e.g., a cloud-based computer network of one or more physical or virtual computers), and may be accessible by the remote control device 103, the one or more voice command-enabled devices 104, and/or any devices of the media device system 110.

Figure 2A:
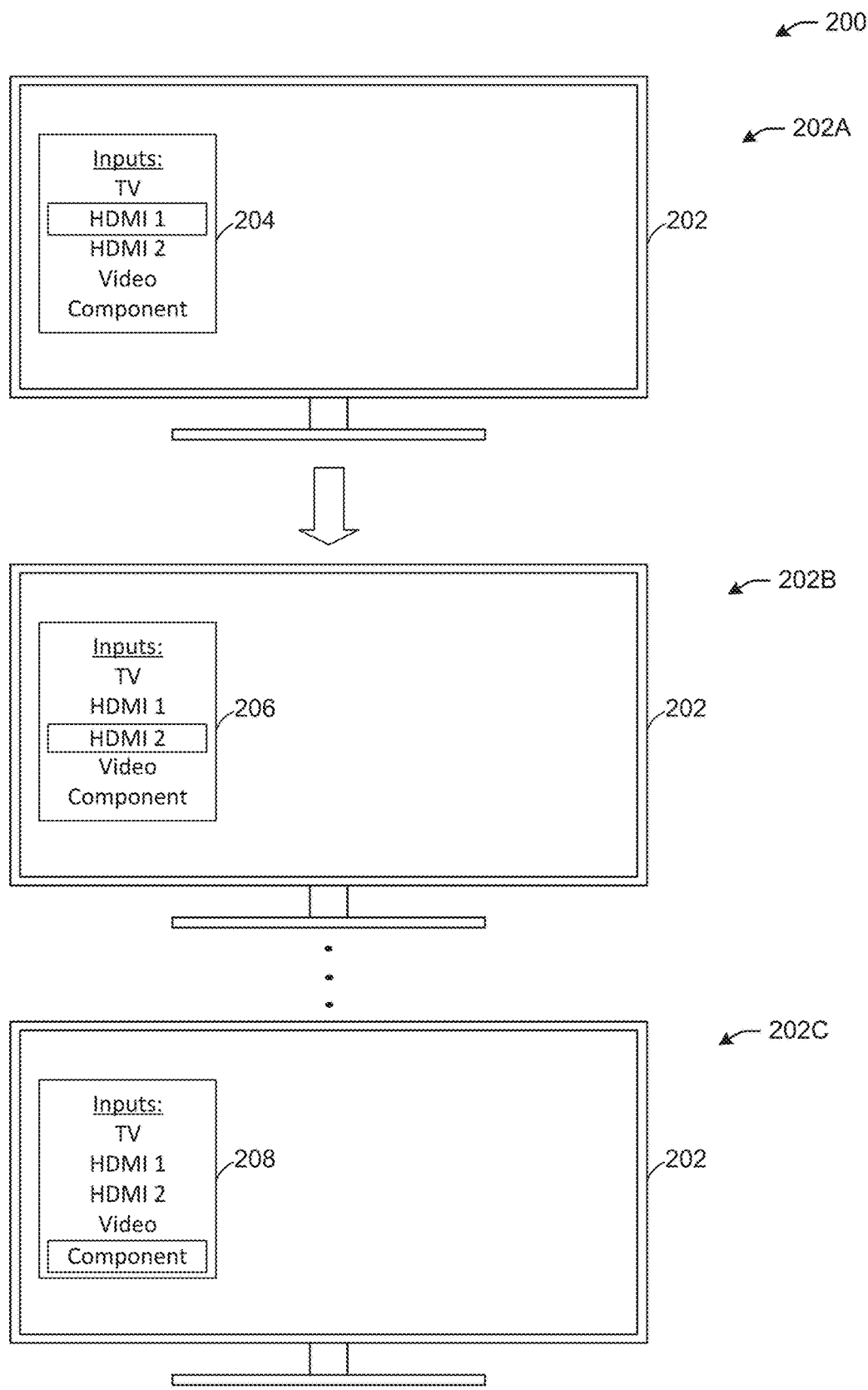
FIG. 2A illustrates a system for automatic media device input scrolling, in accordance with one or more example embodiments of the present disclosure.

FIG. 2A illustrates a system 200 for automatic media device input scrolling, in accordance with one or more example embodiments of the present disclosure.

Referring to FIG. 2A, the system 200 may include a display 202 (e.g., having functionality similar to the display 118 of FIG. 1A and of FIG. 1B). In FIG. 2A, the display 202 uses a unidirectional input scrolling menu 204. For example, when the display 202 receives an input command (e.g., an infrared code corresponding to a "source" or "input" button on a remote control device such as the remote control device 103 of FIG. 1A), the unidirectional input scrolling menu 204 may be displayed. At step 202A, the display 202 may display the unidirectional input scrolling menu 204 with an indication that the active input is HDMI 1. When the unidirectional input scrolling menu 204 allows for each input command to cause the unidirectional input scrolling menu 204 to scroll to the next media input (e.g., from top to bottom, as shown), a first input command to the unidirectional input scrolling menu 204 at step 202A may result in the display of a unidirectional input scrolling menu 206 at step 202B, in which the next media input is HDMI 2. A subsequent input command (e.g., another "input" or "source" button push, or a directional button push once the unidirectional input scrolling menu 204 is displayed) may scroll the media input from HDMI 2 to Video, and a subsequent input command may scroll the media input from Video to Component as shown in a unidirectional input scrolling menu 208 at step 202C. When the display 202 includes a wrap around feature, the subsequent input command received at step 202C may result in the TV input at the top of the unidirectional input scrolling menu 208 being selected. Either an active selection (e.g., an "enter" or "select" button push or touch) or an absence of a selection or input command after a threshold amount of time may cause activation of the highlighted or otherwise indicated media input.

Figure 2B:
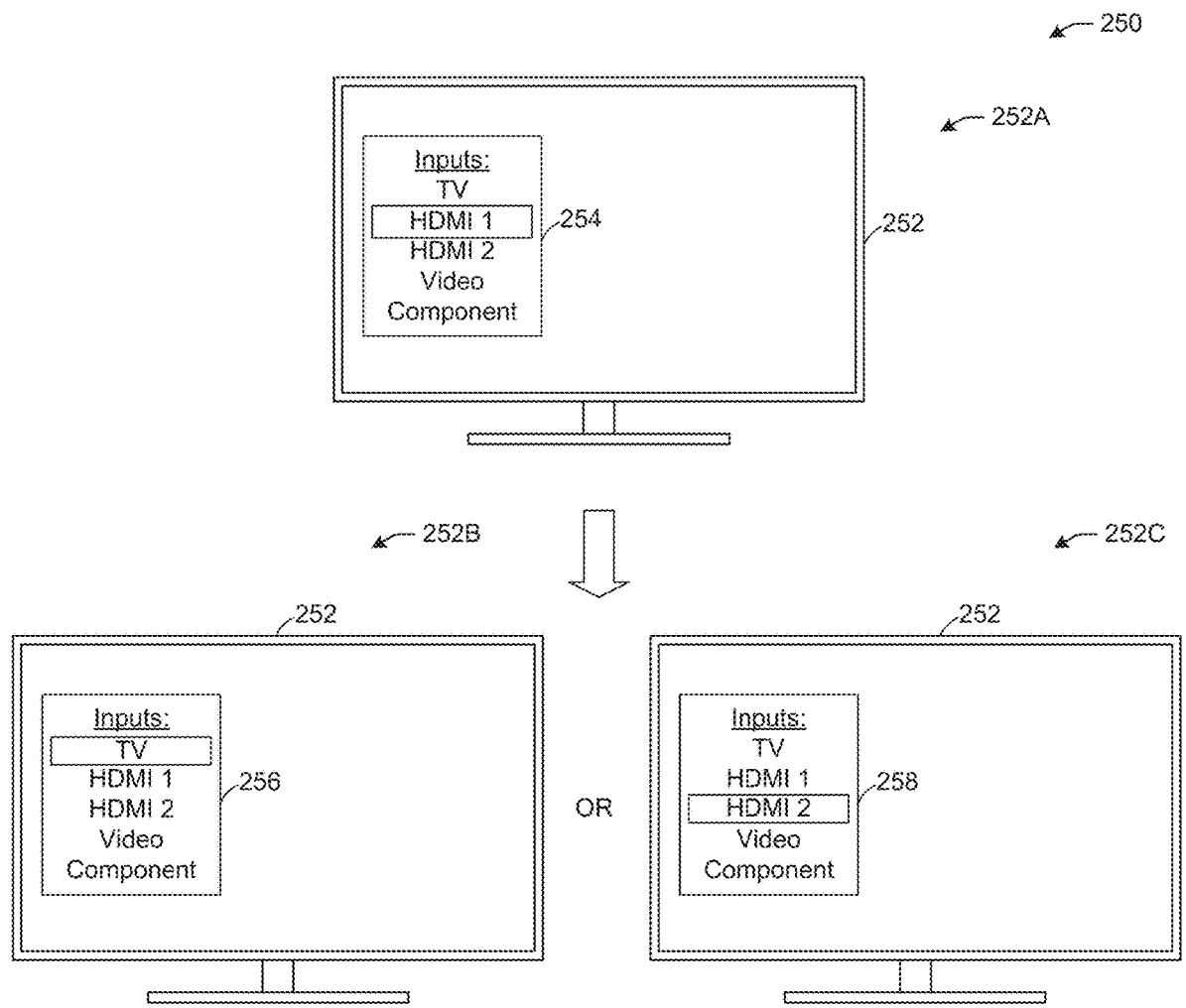
FIG. 2B illustrates a system for automatic media device input scrolling, in accordance with one or more example embodiments of the present disclosure.

FIG. 2B illustrates a system 250 for automatic media device input scrolling, in accordance with one or more example embodiments of the present disclosure.

Referring to FIG. 2B, the system 250 may include a display 202 (e.g., having functionality similar to the display 118 of FIG. 1A and of FIG. 1B). In FIG. 2B, the display 252 uses a bi-directional input scrolling menu 254 (e.g., a multidirectional input scrolling menu). The bi-directional input scrolling menu 254 may allow for input scrolling in multiple directions (e.g., up or down, left or right, depending on the orientation of the bi-directional input scrolling menu 254). For example, when an input command (e.g., an infrared code corresponding to a "source" or "input" button on a remote control device such as the remote control device 103 of FIG. 1A) is received at step 252A when the active media input is HDMI 1, the bi-directional input scrolling menu 254 may scroll in either direction from the active input. When the input command indicates a selection to scroll to a previous media input at step 252B from step 252A, the bi-directional input scrolling menu 254 may be updated to a bi-directional input scrolling menu 256, in which a previous media input (e.g., TV) may be selected. When the input command indicates a selection to scroll to a next media input at step 252C from step 252A, the bi-directional input scrolling menu 254 may be updated to a bi-directional input scrolling menu 258, in which a next media input (e.g., HDMI 2) may be selected. When the display 252 lacks a "wrap around" feature, the bi-directional input scrolling menu 256 may require only a selection downward back to HDMI 1 (or rightward if the bi-directional input scrolling menu 256 were rotated to an orientation with left-right selection instead of up-down selection). When the display 252 includes a wrap around feature, the subsequent input command received at step 252B may result in the Component input at the bottom of the bi-directional input scrolling menu 256 being selected. Either an active selection (e.g., an "enter" or "select" button push or touch) or an absence of a selection or input command after a threshold amount of time may cause activation of the highlighted or otherwise indicated media input.

Referring to FIG. 2A and FIG. 2B, an input menu, when activated by an input command, may start with indicating the active input, or may start with a default input (e.g., the first input, such as TV). In one or more embodiments, the input menu may not be shown, but rather the display 202 and/or the display 252 may scroll from one input to another input without showing the menu. In this manner, the number of input commands needed (e.g., any combination of button pushes or touches of any combination of buttons or icons) to cause activation of an input may depend on whether the display 202 and/or the display 252 requires a command to first display the input menu or not.

Referring to step 138 of FIG. 1A and to step 160 of FIG. 1B, the number of input commands needed to cause activation of a media input may depend on the system 200 of FIG. 2A or the system 250 of FIG. 2B. For example, when the display 202 has the unidirectional input scrolling menu 204 of FIG. 2A, there may be only one number of input commands to cause activation of a media input because the input scrolling menu may scroll from one input on the menu to another input on the menu in one direction. When the display 252 has the bi-directional input scrolling menu 254 of FIG. 2B, there may be multiple ways to scroll from one input on the menu to another input on the menu (e.g., a number of input commands in one direction, and another number of input commands in another direction). In such cases, the fewest amount of input commands may be used to determine the number of input commands to send to cause activation of a media input. In this manner, a state mapping may track the number of inputs an active media input and a requested media input are from the main input in one or multiple directions, depending on the functionality of the device controlling the active media input.

In one or more embodiments, for the one or more servers 122 of FIG. 1A and of FIG. 1B to determine the number of input commands needed to cause activation of a media input, some initial configuration of a media device system (e.g., the media device system 110 of FIG. 1A and of FIG. 1B) may be implemented, and the state mapping may be generated based on the initial configuration. The state mapping may be updated when any indication that a new device has been added to a particular media input (e.g., using additional configuration as described herein). In an initial configuration, the streaming media device 112 of FIG. 1A and of FIG. 1B may provide the type of the display 118 of FIG. 1A and of FIG. 1B (e.g., a manufacturer and/or model of the display 118 as selected by the user 102) to the one or more servers 122. When the one or more servers 122 recognizes (e.g., from one or more libraries of devices and device settings, including input menus, command codes, etc.) the display 118, the one or more servers 122 may send and receive one or more signals with the streaming media device 112 to establish the main input, an active input, the devices connected to any other possible inputs, the buttons or touch icons used to change inputs (e.g., a yes/no confirmation that certain buttons or touch icons are used), that an instruction (e.g., for the remote control device 103 of FIG. 1A) to send a command to the display 118 causes display of the input menu and/or switches from one input to another, and the like. The one or more servers 122 may generate a state mapping using this information, and may update the state mapping to add or remove devices as requested by the user 102 in a similar manner. When the one or more servers 122 does not recognize the display 118, the one or more servers 122 may send and receive one or more signals with the streaming media device 112 to establish the main input, an active input, the devices connected to any other possible inputs, the buttons or touch icons used to change inputs (e.g., one or more choices of buttons or touch icons that the user 102 may select), that an instruction (e.g., for the remote control device 103 of FIG. 1A) to send a command to the display 118 causes display of the input menu and/or switches from one input to another, and the like. The one or more servers 122 may generate a state mapping using this information, and may update the state mapping to add or remove devices as requested by the user 102 in a similar manner. The one or more servers 122 also may establish with the streaming media device 112 whether the streaming media device 112 and the display 118 have CEC one touch play capability, whether a home input may be used to cause activation of the selected input, whether wrap around capability exists, the timing delay to use between respective commands (e.g., which may be included in any instructions), and the like. The one or more servers 122 may determine an error state process for when a voice command does not result in the intended activation of a media input (e.g., the one or more servers 122 may establish whether a CEC one time play code may cause the display 118 to activate the main input, whether instructions may cause the display 118 to switch to the main input, whether instructions may prompt a user to manually select the main input and provide confirmation, etc.).

Figure 3:
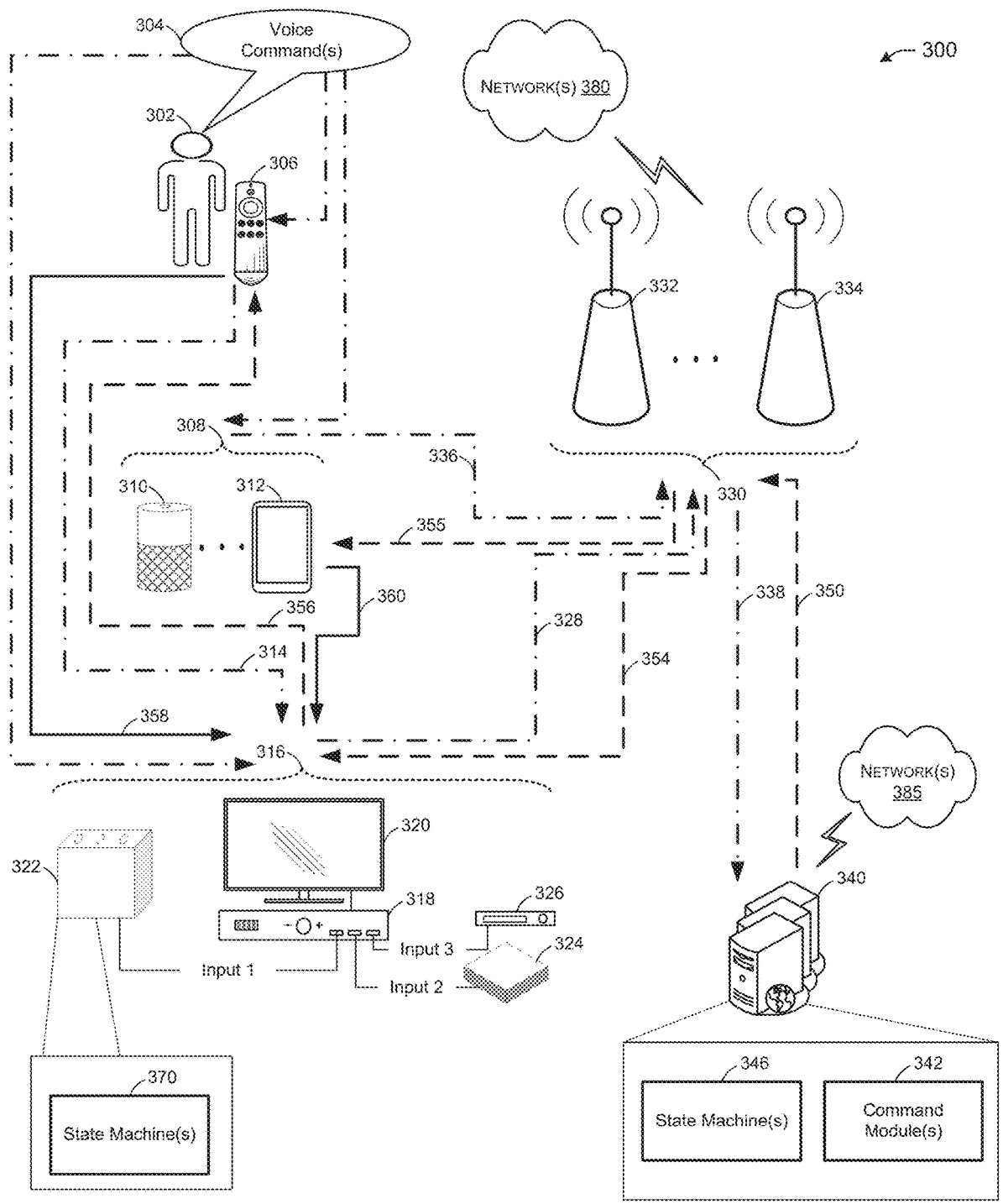
FIG. 3 illustrates a system for automatic media device input scrolling, in accordance with one or more example embodiments of the present disclosure.

FIG. 3 illustrates a system 300 for automatic media device input scrolling, in accordance with one or more example embodiments of the present disclosure.

Referring to FIG. 3, the system 300 may include a user 302 who may utter voice commands 304, such as commands to play certain content, commands to turn devices on or off, commands to activate an input for a particular device, and the like. The voice commands 304 may be detected by a remote control device 306, and/or by one or more voice command-enabled devices 308 (e.g., device 310, device 312). When the remote control device 306 detects the voice commands 304, the remote control device 306 may send voice data 314 (e.g., recordings of the voice commands 304 or representations of the voice commands 304) to a media device system 316, which may include a stereo receiver 318, a display 320, a streaming media device 322, a game console 324, a cable box 326, and any other devices which may provide content to the stereo receiver 318 and/or the display 320. At least one device of the media device system 316 may use infrared capabilities to communicate with another device (e.g., with the remote control device 306). The streaming media device 322 may receive the voice data 314, and may send voice data (e.g., recordings of the voice commands 304 or representations of the voice commands 304) and one or more identifiers 328 (e.g., device and/or user identifiers) to one or more access points 330 (e.g., access point 332, access point 334. When the one or more voice command-enabled devices 308 receive the voice commands 304, the one or more voice command-enabled devices 308 may send voice data (e.g., recordings of the voice commands 304 or representations of the voice commands 304) and one or more identifiers 336 (e.g., device and/or user identifiers) to the one or more access points 330.

Still referring to FIG. 3, the one or more access points 330 may send voice data (e.g., recordings of the voice commands 304 or representations of the voice commands 304) and one or more identifiers 338 (e.g., device and/or user identifiers) to one or more servers 340 (e.g., similar to the one or more servers 122 of FIG. 1A and of FIG. 1B). The one or more servers 340 may store or have access to one or more state machines 346 (e.g., state mappings that indicate a main input of the media device system 316, an active input of the media device system 316, the media devices and their respective media inputs of the media device system 316, device capabilities/settings based on one or more device identifiers, etc.) and one or more command modules 342, which may be used to translate the voice commands 304 (e.g., based on the received voice data) into instructions, such as instructions to cause an activation of a media input at the media device system 316 (e.g., based on the one or more state machines 346). For example, the one or more servers 340 may perform step 135, step 136, step 138, and step 140 of FIG. 1A, and step 156, step 158, step 160, and step 162 of FIG. 1B.

Still referring to FIG. 3, the one or more servers 340 may send one or more instructions 350 (e.g., according to step 140 of FIG. 1A or to step 162 of FIG. 1B) to the one or more access points 330 (e.g., the voice data and identifiers 338 may be sent with a return address associated with the one or more access points 330). The one or more instructions 350 may indicate the number of input commands needed to cause activation of an input, the direction of input commands (e.g., up, down, left, right) to cause activation of an input, the device needed to send the input commands, and the device to receive the input commands. The one or more access points 330 may send instructions to a device, such as instructions 354 to the streaming media device 112 (or another device of the media device system 316), and/or instructions 355 to the one or more voice command-enabled devices 308. When the one or more instructions 350 indicate the device needed to send the input commands and/or the device to receive the input commands, but lack the number of input commands needed to cause activation of an input, the one or more instructions 354 and/or the one or more instructions 355 may indicate the device to send the input commands and/or the device to receive the input commands, but lack the number of input commands needed to cause activation of an input, thereby allowing the one or more voice command-enabled devices 308 or a device of the media device system 316 (e.g., the streaming media device 322) to determine the number of input commands needed to cause activation of an input and/or the direction of input commands (e.g., up, down, left, right) to cause activation of an input (e.g., as explained further with regard to FIG. 7). For example, the streaming media device 322 or the one or more voice command-enabled devices 308 may have one or more state mappings (e.g., one or more state machines 370 with a state mapping for the media device system 316), and may use the state mappings to determine a currently active input, a requested input, a main input, and the number of input commands needed to activate the requested input at a device of the media device system 316. When the streaming media device 322 determines the number of inputs (e.g., as described with respect to step 740 of FIG. 7), the streaming media device 322 may send command codes 356 to the remote control device 306 so that the remote control device 306 may send the corresponding commands 358 (e.g., infrared codes causing a change in active input) to a device of the media device system 316.

Still referring to FIG. 3, when a device of the media device system 316 receives the instructions 354, the device (e.g., the streaming media device 322) may determine the command codes to send to the stereo receiver 318 and/or to the display 320 (e.g., Wi-Fi commands, Bluetooth commands, HDMI/CEC commands, etc.) and may send the command codes to the stereo receiver 318 and/or to the display 320, or may determine the command codes for the remote control device 306 to send to the stereo receiver 318 and/or to the display 320, and may send the command codes 356 to the remote control device 306, which may send the corresponding commands 358 (e.g., infrared codes causing a change in active input) to the stereo receiver 318 and/or to the display 320. When the one or more voice command-enabled devices 308 receives the instructions 355, the one or more voice command-enabled devices 308 may send commands 360 (e.g., wireless commands, such as Wi-Fi or Bluetooth) to one or more devices of the media device system 316 to cause activation of a media input. The receiver 318 and/or to the display 320 may receive commands from the remote control device 306, from the one or more voice command-enabled devices 308, and/or from the streaming media device 322, the commands including any commands which may cause the performance of actions, such as turning on or off a device, changing a channel, selecting content for playback, changing the active media input from one input to another input, prompting a user for feedback (e.g., confirmation of an active input), and the like.

The one or more access points 330 may be configured to communicate via a communications network 380, and the one or more servers 340 may be configured to communicate via a wireless communications network 385, wirelessly or wired (e.g., the same or different wireless communications networks used to provide access between the one or more access points 330 and respectively connected devices, and the one or more servers 340, such as for a cloud-based network). The communications network 380 and/or the communications network 385 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 380 and/or the communications network 385 may have any suitable communication range associated therewith and may include, for example, global networks (e.g., the Internet), metropolitan area networks (MANs), wide area networks (WANs), local area networks (LANs), or personal area networks (PANs). In addition, communications network 380 and/or the communications network 385 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

The one or more access points 330 may include any suitable processor-driven device including, but not limited to, a mobile device or a non-mobile, e.g., a static, device. For example, the one or more access points 330 may include, a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. It is understood that the above is a list of devices. However, other devices, including smart devices, Internet of Things (IoT), such as lamps, climate control, car components, household components, appliances, etc. may also be included in this list.

Figure 4A:
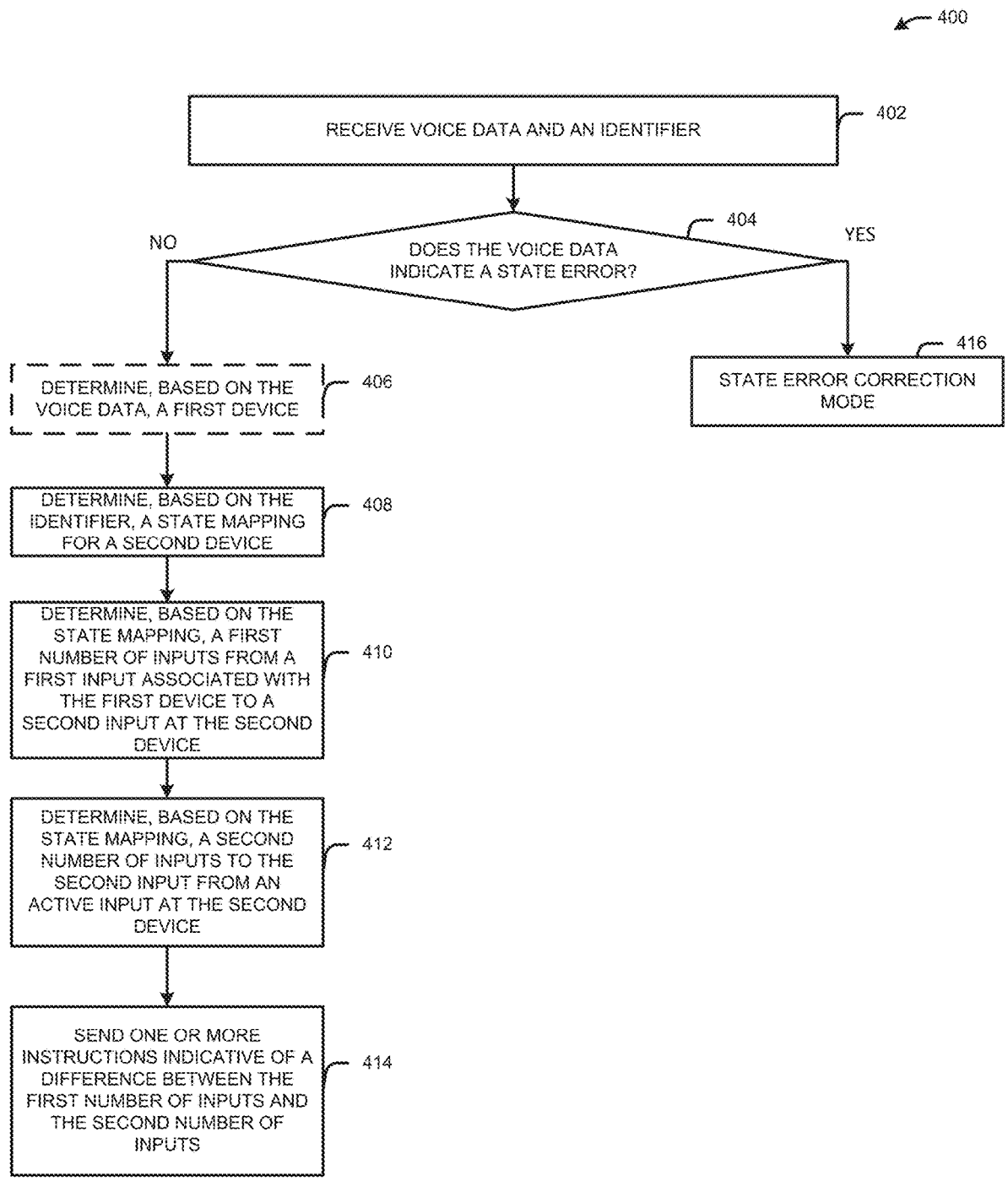
FIG. 4A illustrates a flow diagram for a process for automatic media device input scrolling, in accordance with one or more example embodiments of the present disclosure.

FIG. 4A illustrates a flow diagram for a process 400 for automatic media device input scrolling, in accordance with one or more example embodiments of the present disclosure.

At block 402, a system (e.g., the one or more servers 122 of FIG. 1A and of FIG. 1B, the one or more servers 340 of FIG. 3) may receive voice data and one or more identifiers (e.g., according to step 134 of FIG. 1A or to step 154 of FIG. 1B). The voice data may be a recording or other representation of a voice command (e.g., the voice commands 304 of FIG. 3), which may indicate a user command to switch the active input (e.g., of a television or receiver) to a media input or to activate the corresponding media input of a device uttered in the voice data. For example, the voice data may indicate a voice command such as, "Switch inputs up one" (or another number), "Switch inputs down one" (or another number), "Switch to Input X," "Switch to Device Y," "Play Content X," "Activate Device Y," and the like. The one or more identifiers may include address information for the devices, such as Internet protocol (IP) addresses, MAC addresses, and the like, may include manufacturer and/or model information of a device, may include a user or user account identifier, and the like.

At block 404, the system may determine whether the voice data indicates a state error. The system may maintain a media state mapping (e.g., the one or more state machines 346 of FIG. 3) that indicates which particular media devices are connected to respective media inputs of a television or receiver. When the voice data is repeat voice data received within a threshold amount of time (e.g., indicative that a user's voice command was not satisfied), or when a corrective voice utterance (e.g., "Switch inputs," "Switch inputs again") is identified in the voice data, the system may identify a state error. When no state error is determined (e.g., the voice data is not a repeat within a short amount of time and/or the voice data identifies a device, an input, and/or content to play), the process 400 may continue at block 406.

At block 406, the system optionally may determine a first device based on the voice data. For example, when the voice data includes an utterance of a particular media device, the system may identify the words of the device as the first device (e.g., the first device may include the words "streaming media device," "cable box," "game console," "Blu-ray player," and the like). Based on the identification of a media device in the voice data, the system may determine that the voice data is indicative of an action related to the first device, and may use further processing to determine what the action is. When the voice data specifies a media input, such as a voice command to "Select HDMI 1," for example, the process 400 may skip block 406, as the system may not need to determine the first device in order to determine instructions to provide to cause performance of one or more actions to satisfy the voice command.

At block 408, the system may determine, based on an identifier, a state mapping for a second device (e.g., the television or stereo receiver controlling the active media input). The identifier may identify one or more devices in a media device system (e.g., the streaming media device 112 of FIG. 1A and of FIG. 1B). When the system identifies the first device in the voice data or a media input uttered in the voice data, the system may determine which media device system to control based on the voice data. The identifier may identify one or more devices in a media device system, and the system may determine the corresponding state mapping for the media device system. The state mapping may indicate a main input, an active input, the number of inputs any device input is from the main input in any state (e.g., depending on the active input of the device), the number of input commands to cause activation of any input given the current state of the device, and the like.

At block 410, the system may determine, based on the state mapping, a first number of inputs from a first input (e.g., the corresponding input of the first device or the input specified by the voice data) to a second input (e.g., the main input) at the second device (e.g., at the television or receiver controlling the active media input). For example, the system may perform step 138 of FIG. 1A or step 160 of FIG. 1B to determine the first number of inputs. The first number of inputs may be based on the number of input commands needed to scroll from the second input to the first input. When there are multiple ways to scroll from the second input to the first input or vice versa, the system may determine the shortest number of inputs for the first number of inputs.

At block 412, the system may determine, based on the state mapping, a second number of inputs from the active input to the second input (e.g., the main input) at the second device (e.g., at the television or receiver controlling the active media input). For example, the system may perform step 138 of FIG. 1A or step 160 of FIG. 1B to determine the second number of inputs. The second number of inputs may be based on the number of input commands needed to scroll from the active input to the second input or vice versa. When there are multiple ways to scroll from the second input to the active input or vice versa, the system may determine the shortest number of inputs for the second number of inputs.

At block 414, the system may send one or more instructions (e.g., according to step 140 of FIG. 1A or step 162 of FIG. 1B) to one or more devices. The instructions may be indicative of the difference between the first number of inputs and the second number of inputs. For example, when the first number of inputs is three, and the second number of inputs is one, then the difference—two—may indicate that two command inputs are to be sent to a device (e.g., television or stereo receiver controlling the active input) to activate an input requested by the voice command. The instructions may indicate a device address and/or other device identifying information to allow the receiving device to determine which device is to receive a command to cause the action corresponding to the active input selection. The instructions may indicate that the difference (e.g., a number of input commands) are to be sent to a device. The receiving device may determine which command codes to send to the device controlling the active media input to cause activation of the selected media input.

When a state error is detected at block 404, the process 400 may continue to block 416, where the system may enter a state error correction mode. The state error correction mode may be identified based on the type of media device system corresponds to the voice command. For example, based on an initial configuration of a media device system, the system may determine how to respond to an error state (e.g., the system may invalidate the state mapping and set the state of the media device system to an error state). When a CEC one touch play feature is available, the state error correction mode may include the system sending an instruction to provide a CEC one touch play signal to the television or receiver controlling the active media input. Once in a known input, such as the main input (e.g., after sending an instruction for a CEC one touch play signal and/or after receiving confirmation that the main input has been activated), the system may determine the number of input commands to cause the television or receiver to scroll from the main input to the first input, and may send instructions indicating the number of input commands to send. Without a CEC one touch play option, the system may prompt the user to provide an indication of the active input (e.g., with additional voice data or a selection of a list of available media inputs), or may prompt the user to request an input scroll (e.g., with a voice command such as "Switch input up," etc.) until no additional voice commands to activate an input are identified within a threshold amount of time.

Figure 4B:
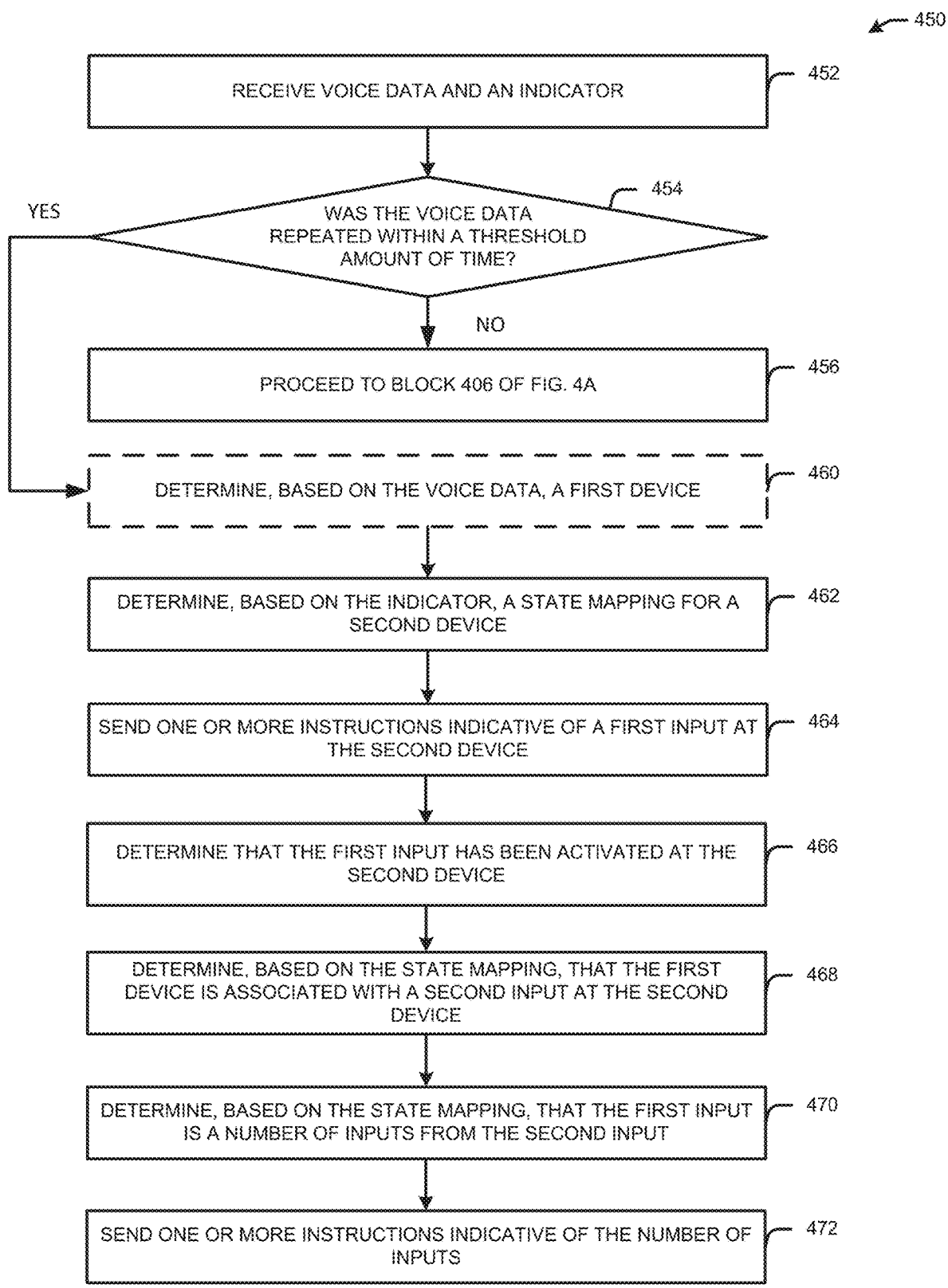
FIG. 4B illustrates a flow diagram for a process for automatic media device input scrolling, in accordance with one or more example embodiments of the present disclosure.

FIG. 4B illustrates a flow diagram for a process 450 for automatic media device input scrolling, in accordance with one or more example embodiments of the present disclosure.

At block 452, a system (e.g., the one or more servers 122 of FIG. 1A and of FIG. 1B, the one or more servers 340 of FIG. 3) may receive voice data and one or more identifiers (e.g., according to step 134 of FIG. 1A or to step 154 of FIG. 1B). The voice data may be a recording or other representation of a voice command (e.g., the voice commands 304 of FIG. 3), which may indicate a user command to switch the active input (e.g., of a television or receiver) to a media input or to activate the corresponding media input of a device uttered in the voice data. For example, the voice data may indicate a voice command such as, "Switch inputs up one" (or another number), "Switch inputs down one" (or another number), "Switch to Input X," "Switch to Device Y," "Play Content X," "Activate Device Y," and the like. The one or more identifiers may include address information for the devices, such as Internet protocol (IP) addresses, MAC addresses, and the like, may include manufacturer and/or model information of a device, may include a user or user account identifier, and the like.

At block 454, the system may determine whether the voice data was the same voice data, with a same identifier, as previously received by the system within a threshold amount of time (e.g., a repeat voice command indicating that the voice command was not properly executed). For example, when the voice data indicates a selection of a media device input, a selection of a media device, or a selection of content to render, when the voice data was previously received (e.g., within a minute from prior received voice data), such a repeated command may indicate that the system did not cause the one or more actions intended by the voice command corresponding to the voice data (e.g., the requested media input was not activated or the input corresponding to selected media content was not activated). If the voice data is not a repeat, or if an error state is otherwise not detected, the process 450 may proceed to block 406 of FIG. 4A. When the voice data is a repeat or an error state is otherwise detected based on the voice data, the process 450 may continue to block 460.

At block 460, the system optionally may determine a first device based on the voice data. For example, when the voice data includes an utterance of a particular media device, the system may identify the words of the device as the first device (e.g., the first device may include the words "streaming media device," "cable box," "game console," "Blu-ray player," and the like). Based on the identification of a media device in the voice data, the system may determine that the voice data is indicative of an action related to the first device, and may use further processing to determine what the action is. When the voice data specifies a media input, such as a voice command to "Select HDMI 1," for example, the process 450 may skip block 460.

At block 462, the system may determine, based on an identifier, a state mapping for a second device (e.g., the television or stereo receiver controlling the active media input). The identifier may identify one or more devices in a media device system (e.g., the streaming media device 112 of FIG. 1A and of FIG. 1B). When the system identifies the first device in the voice data or a media input uttered in the voice data, the system may determine which media device system to control based on the voice data. The identifier may identify one or more devices in a media device system, and the system may determine the corresponding state mapping for the media device system. The state mapping may indicate a main input, an active input, the number of inputs any device input is from the main input in any state (e.g., depending on the active input of the device), the number of input commands to cause activation of any input given the current state of the device, and the like.

At block 464, the system may send one or more instructions indicative of a first input at the second device (e.g., the main input at a television or receiver). The state mapping may indicate which media input is the main input for a given media device system (e.g., the main input may be for a streaming media device which may send voice data to the system). When a CEC one touch play feature is available, the instructions may indicate a directive to provide a CEC one touch play signal to the television or receiver controlling the active media input. Once in a known input, such as the main input (e.g., after sending an instruction for a CEC one touch play signal and/or after receiving confirmation that the main input has been activated), the system may determine the number of input commands to cause the television or receiver to scroll from the main input to the first input, and may send instructions indicating the number of input commands to send. Without a CEC one touch play option, the system may prompt the user to provide an indication of the active input (e.g., with additional voice data or a selection of a list of available media inputs), or may prompt the user to request an input scroll (e.g., with a voice command such as "Switch input up," etc.) until no additional voice commands to activate an input are identified within a threshold amount of time.

At block 466, the system may determine that the first input (e.g., the main input) has been activated at the second device. When a CEC one touch play feature is available, the system may wait a predetermined or preferred amount of time to allow for the second device to activate the first input before sending any additional instructions which may correspond to commands sent to the second device. The system may send instructions to cause the second device to prompt the user to confirm that the first input has been activated at the second device. When the system receives such confirmation (e.g., from a media device in the media device system or a voice command-enabled device), the system may determine that the first input has been activated at the second device.

At block 468, the system may determine, based on the state mapping, that the first device is associated with a second input at the second device (e.g., the first device is operatively connected to the second device through a second input at the second device, such as an HDMI port or other type of media input). At block 470, the system may determine, based on the state mapping, that the first input is a number of inputs from the second input (e.g., uses a number of input commands to scroll from the first input to the second input, or vice versa). Because the system has confirmed that the second device has activated the first input, the system may determine the number (and type) of commands used to cause activation of the second input at the second device.

At block 472, the system may send one or more instructions indicative of the number of inputs from the first input to the second input. The instructions may indicate a number of command codes to send to the second device to cause the second device to activate the second input.

Figure 5:
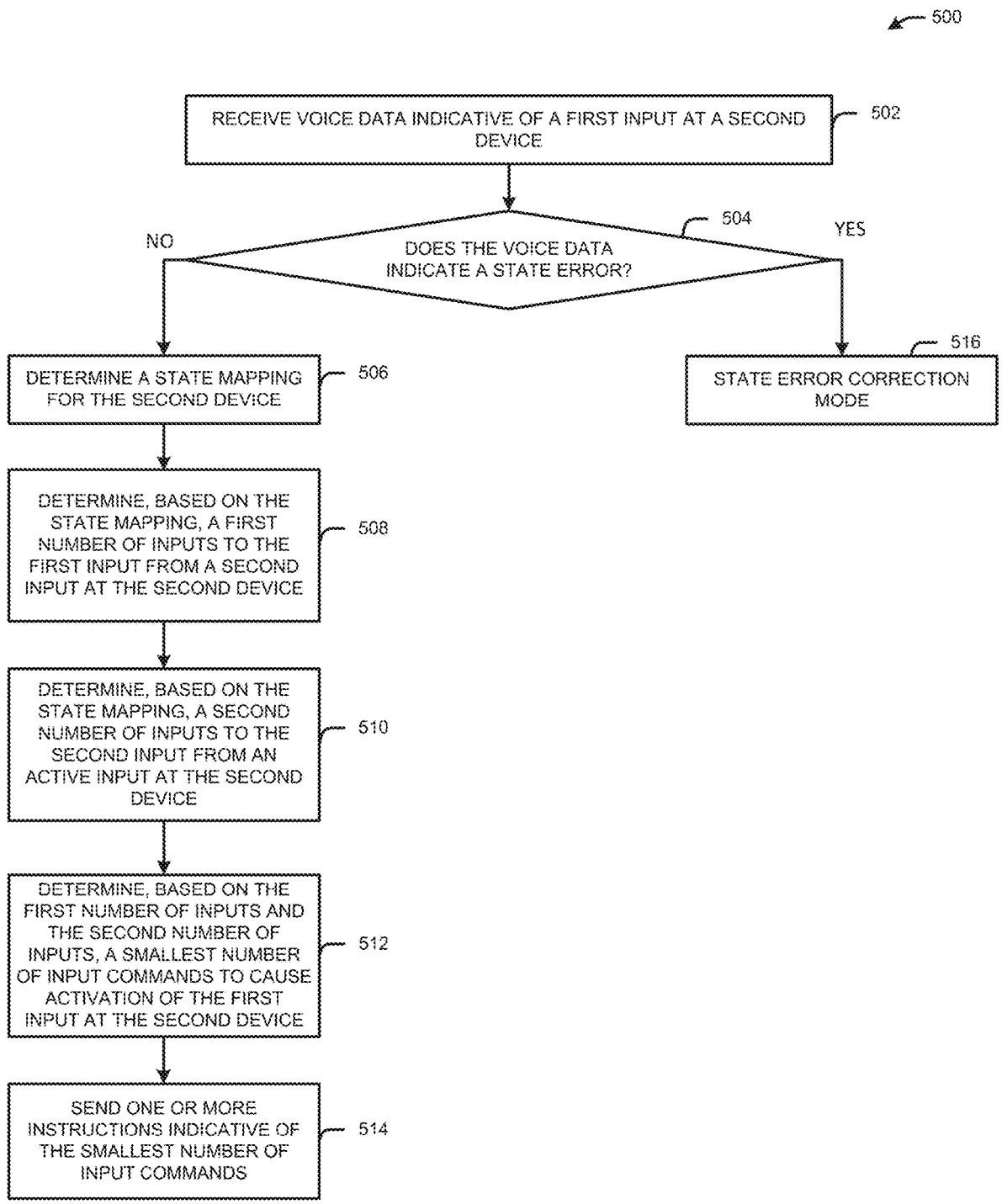
FIG. 5 illustrates a flow diagram for a process for automatic media device input scrolling, in accordance with one or more example embodiments of the present disclosure.

FIG. 5 illustrates a flow diagram for a process 500 for automatic media device input scrolling, in accordance with one or more example embodiments of the present disclosure.

At block 502, a system (e.g., the one or more servers 122 of FIG. 1A and of FIG. 1B, the one or more servers 340 of FIG. 3) may receive voice data and one or more identifiers (e.g., according to step 134 of FIG. 1A or to step 154 of FIG. 1B). The voice data may be a recording or other representation of a voice command (e.g., the voice commands 304 of FIG. 3), which may indicate a user command to switch the active input (e.g., of a television or receiver) to a media input or to activate the corresponding media input of a device uttered in the voice data. For example, the voice data may indicate a voice command such as, "Switch inputs up one" (or another number), "Switch inputs down one" (or another number), "Switch to Input X," "Switch to Device Y," "Play Content X," "Activate Device Y," and the like. The one or more identifiers may include address information for the devices, such as Internet protocol (IP) addresses, MAC addresses, and the like, may include manufacturer and/or model information of a device, may include a user or user account identifier, and the like.

At block 504, the system may determine whether the voice data indicates a state error. The system may maintain a media state mapping (e.g., the one or more state machines 346 of FIG. 3) that indicates which particular media devices are connected to respective media inputs of a television or receiver. When the voice data is repeat voice data received within a threshold amount of time (e.g., indicative that a user's voice command was not satisfied), or when a corrective voice utterance (e.g., "Switch inputs," "Switch inputs again") is identified in the voice data, the system may identify a state error. When no state error is determined (e.g., the voice data is not a repeat within a short amount of time and/or the voice data identifies a device, an input, and/or content to play), the process 500 may continue at block 506.

At block 506, the system may determine, based on an identifier, a state mapping for a second device (e.g., the television or stereo receiver controlling the active media input). The identifier may identify one or more devices in a media device system (e.g., the streaming media device 112 of FIG. 1A and of FIG. 1B). When the system identifies the first device in the voice data or a media input uttered in the voice data, the system may determine which media device system to control based on the voice data. The identifier may identify one or more devices in a media device system, and the system may determine the corresponding state mapping for the media device system. The state mapping may indicate a main input, an active input, the number of inputs any device input is from the main input in any state (e.g., depending on the active input of the device), the number of input commands to cause activation of any input given the current state of the device, and the like.

At block 508, the system may determine, based on the state mapping, a first number of inputs from a first input (e.g., the corresponding input of the first device or the input specified by the voice data) to a second input (e.g., the main input) at the second device (e.g., at the television or receiver controlling the active media input), or vice versa. For example, the system may perform step 138 of FIG. 1A or step 160 of FIG. 1B to determine the first number of inputs. The first number of inputs may be based on the number of input commands needed to scroll from the second input to the first input. When there are multiple ways to scroll from the second input to the first input or vice versa, the system may determine the shortest number of inputs for the first number of inputs.

At block 510, the system may determine, based on the state mapping, a second number of inputs from the active input to the second input (e.g., the main input) at the second device (e.g., at the television or receiver controlling the active media input), or vice versa. For example, the system may perform step 138 of FIG. 1A or step 160 of FIG. 1B to determine the second number of inputs. The second number of inputs may be based on the number of input commands needed to scroll from the active input to the second input or vice versa. When there are multiple ways to scroll from the second input to the active input or vice versa, the system may determine the shortest number of inputs for the second number of inputs.

At block 512, the system may determine, based on the first number of inputs and the second number of inputs, a smallest number of input commands (or other commands) to cause the second device to activate the first input. Based on whether the input menu of the television or receiver controlling the active input is uni-directional or bi-directional, and/or whether the input menu includes a wrap around feature, the system may determine, using the second input (e.g., the main input) as a reference input, the fewest number of inputs from the active input to the first input (e.g., the shortest path in terms of the number of input scroll movements—up, down, left, or right on the input menu) to cause the second device to scroll from the active input to the first input (e.g., to change the active input from the currently active input to the requested input). When there are multiple directional options for input scrolling, corresponding to multiple numbers of commands used to cause activation of the first input, the system may determine that one number of inputs or commands is less than another, and may select the smallest number of inputs or commands.

At block 514, the system may send one or more instructions indicative of the smallest number of input commands to use to cause activation of the first input at the second device. For example, the system may perform step 140 of FIG. 1A or step 162 of FIG. 1B. The instructions may indicate a device address and/or other device identifying information to allow the receiving device to determine which device is to receive a command to cause the action corresponding to the active input selection. The instructions may indicate that a number of input commands is to be sent to a device (e.g., the second device). The receiving device may determine which command codes to send to the device controlling the active media input to cause activation of the selected media input.

When the system determines a state error at block 504, the process 500 may continue to block 516, where the system may enter a state error correction mode. The state error correction mode may be identified based on the type of media device system corresponds to the voice command. For example, based on an initial configuration of a media device system, the system may determine how to respond to an error state (e.g., the system may invalidate the state mapping and set the state of the media device system to an error state). When a CEC one touch play feature is available, the state error correction mode may include the system sending an instruction to provide a CEC one touch play signal to the television or receiver controlling the active media input. Once in a known input, such as the main input (e.g., after sending an instruction for a CEC one touch play signal and/or after receiving confirmation that the main input has been activated), the system may determine the number of input commands to cause the television or receiver to scroll from the main input to the first input, and may send instructions indicating the number of input commands to send. Without a CEC one touch play option, the system may prompt the user to provide an indication of the active input (e.g., with additional voice data or a selection of a list of available media inputs), or may prompt the user to request an input scroll (e.g., with a voice command such as "Switch input up," etc.) until no additional voice commands to activate an input are identified within a threshold amount of time.

The embodiments described above are examples and are not meant to be limiting.

Figure 6:
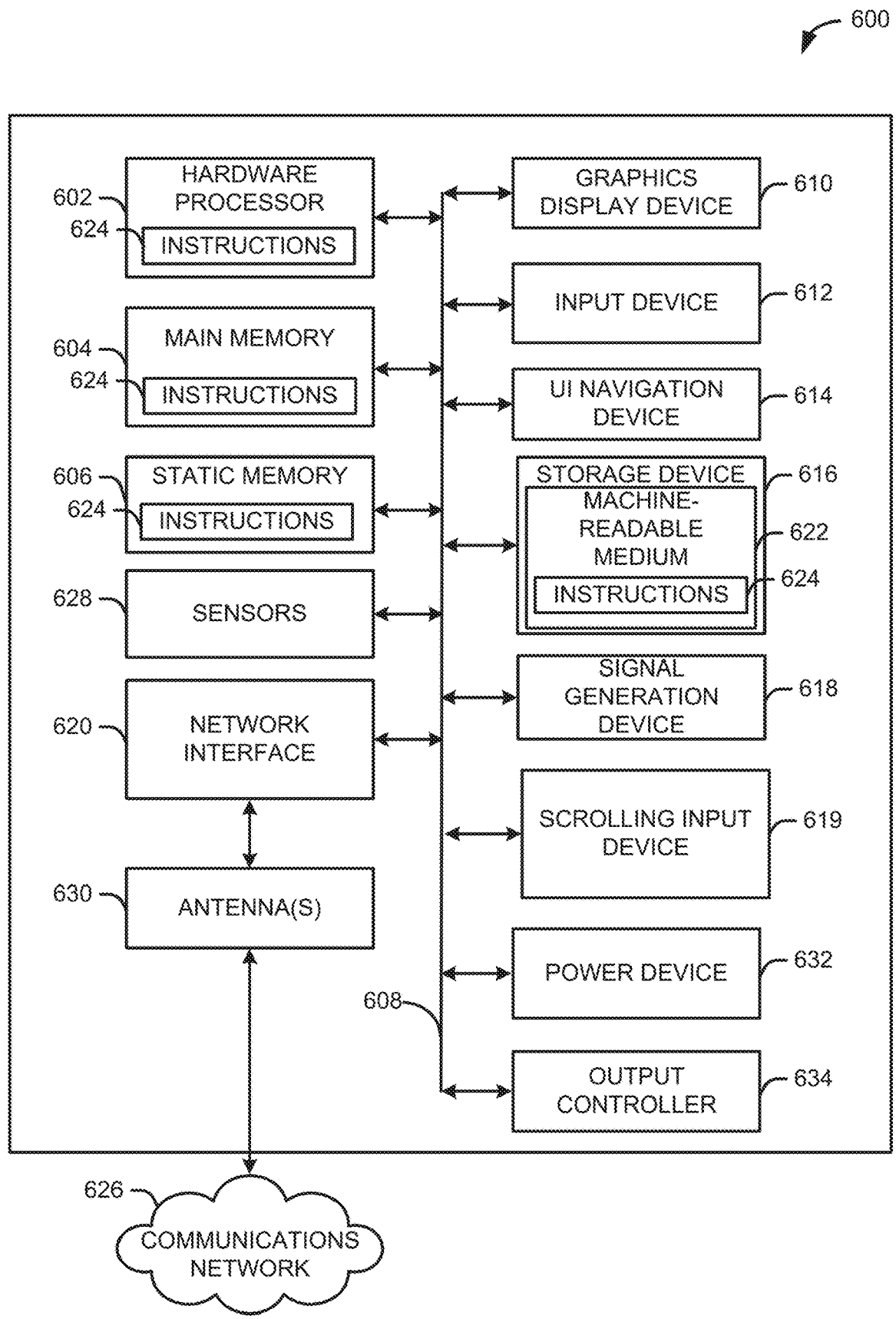
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 (e.g., the remote control device 103 of FIG. 1A, a media device of the media device system 110 of FIG. 1A and FIG. 1B, the one or more servers 122 of FIG. 1A and FIG. 1B, the one or more voice command-enabled devices 104 of FIG. 1B, the display 202 of FIG. 2A, the display 252 of FIG. 2B, the remote control device 306 of FIG. 3, the one or more voice command-enabled devices 308 of FIG. 3, a device of the media device system 316 of FIG. 3, the one or more servers 340 of FIG. 3) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P), cellular, (or other distributed) network environments. The machine 600 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard, touch pad, buttons), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., when implemented as a remote control device, the signal generation device 618 may generate infrared command signals with command codes that cause media devices to perform actions, such as generate an input menu, scroll from one media input to another media input, activate a media input, etc.), a scrolling input device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a display, stereo receiver, media device, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The scrolling input device 619 may carry out or perform any of the operations and processes (e.g., process 400 of FIG. 4A, process 450 of FIG. 4B, process 500 of FIG. 5) described and shown above.

In one or more embodiments, the scrolling input device 619 may be implemented as part of a remote network (e.g., the one or more servers 122 of FIG. 1A and FIG. 1B, the one or more servers 340 of FIG. 3). The scrolling input device 619 may maintain a media state mapping (e.g., the one or more state machines 346 of FIG. 3) that indicates which particular media devices are connected to respective media inputs of a television or receiver. In one example, a streaming media device (e.g., the streaming media device 112 of FIG. 1A and FIG. 1B) may be designated as the center input of a television or receiver at HDMI 2. The television or receiver also may have a cable box operatively connected to HDMI 1, a media player (e.g., a Blu-ray player, DVD player, record player, etc.) operatively connected to HDMI 3, and a game console operatively connected to HDMI 4. Other media devices may be operatively connected to the television or receiver using any type of media input available at the television or receiver, and the media state mapping may indicate which media devices are operatively connected to the television or receiver using which respective media inputs (e.g., the state mapping may indicate that the HDMI 1 media input is used by a cable box, the HDMI 2 input is used by the streaming media device, the HDMI 3 input is used by the media player, and the HDMI 4 input is used by the game console). Using the media state mapping, the scrolling input device 619 may determine the number of media inputs any respective media device is from the media input used by the center input. For example, when the center input is the streaming media device at HDMI 2, the cable box may be one input away at HDMI 1 (or four inputs away at HDMI 1 when the television or receiver may scroll from one media input to another in one direction, such as from HDMI 2 to HDMI 3, from HDMI 3 to HDMI 4, and from HDMI 4 to HDMI 1). The media state mapping may allow a device such as a television or receiver to simulate the ability to receive and process discrete media input commands (e.g., a first command that causes the television to select HDMI 1 regardless of which media input is being used when the command is received, a second command that causes the television to select HDMI 2, etc.).

In one or more embodiments, the machine 600 may be implemented at least partially in a device that can receive voice commands (e.g., the remote control device 103 of FIG. 1A, the streaming media device 112 of FIG. 1A and FIG. 1B, the one or more voice command-enabled devices 104 of FIG. 1B). The sensors 628 may detect voice commands (e.g., utterances). For example, a remote control device, streaming media device, or other type of device may receive a voice command to select and render content, to execute media applications (e.g., to initiate a streaming media service application), and to cause a device to select a specific media input corresponding to a particular media device (e.g., "Switch inputs to the cable box.").

In one or more embodiments, the scrolling input device 619 (e.g., when implemented in a remote server, such as the one or more servers 122 of FIG. 1A and FIG. 1B) may receive voice commands from a media device, may determine one or more actions corresponding a voice command (e.g., for any combination of devices to execute), and may send instructions to one or more media devices to cause the execution of the actions corresponding to a voice command. The scrolling input device 619 may have access to the media state mapping, which may be provided to the scrolling input device 619 by a media device in a media device system. For example, a media device user may provide a voice command to switch media inputs of a television or receiver (e.g., "Switch inputs to the streaming media device."). The voice command may be detected by a remote control device, sent to a media device (e.g., the streaming media device), and sent from the streaming media device to the scrolling input device 619. The voice command may be received by another media device (e.g., rather than a remote control device) and sent to the scrolling input device 619.

In one or more embodiments, the scrolling input device 619 may determine that the voice command corresponds to a request to switch inputs at a television or receiver (e.g., based on which media device in the media state mapping controls the media inputs). Using the media state mapping, the scrolling input device 619 may identify the media input corresponding to the main input and/or to the currently selected media input of the television or stereo, and may determine the number of input command signals to send to the television or stereo to cause the television or stereo to activate the media input corresponding to the media device identified from the voice command. The scrolling input device 619 may send one or more instructions to a media device (e.g., the streaming media device or the other media device) indicating that the television or receiver is to activate the corresponding media input of the streaming media device (e.g., the instructions may specify the specific number of "change input" command signals to send to the television or receiver to cause the television or receiver to scroll to the media input of the media device identified from the voice command). For example, when the television or stereo is on HDMI 1, and the voice command requests the input for a media device operatively connected to HDMI 3, the number of input commands required to move from HDMI 1 to activate HDMI 3 may be two, so the scrolling input device 619 may send instructions to the streaming media device or other device to provide two input command signals (or a different number of signals, such as a first signal to display a list of media inputs, and the number of signals needed to move from the currently selected media input to the requested media input) to the television or receiver. The streaming media device or the other device may send the commands to the television or receiver, or may send signals to a remote control device to send the command (e.g., infrared commands) to the television or receiver.

In one or more embodiments, the scrolling input device 619 may determine, using the media state mapping, the number of commands needed to cause a television or receiver to activate the requested media input (e.g., voice data from the voice command may be sent along with an identifier, such as a MAC address of the device sending the voice data). The scrolling input device 619 may store or have access to information regarding the television or receiver. The media state mapping may provide an indication of the model or other device identifier (e.g. a medium access control address, an Internet protocol address, etc.) of any media device, and the scrolling input device 619 may identify a media system and corresponding media state mapping based on the media device, along with the type of input commands, input menus/interfaces, etc. used by the television or receiver in the media system. For example, some device models may receive sequential input change commands, causing the device to switch media inputs sequentially with each received command. Some device models may use interfaces or menus which display a list or other representation of available media inputs, and may require an input command to cause the display of such an interface or menu before receiving respective commands to scroll or otherwise move from one media input to another media input. For example, an interface may list HDMI 1-HDMI 4 media inputs, and may require a separate input command to move from HDMI 1 to HDMI 2, from HDMI 2 to HDMI 3, and so on, with a media input being selected when no more input signals are received after a threshold amount of time. Such menus and interfaces may be unidirectional (e.g., may only scroll in one direction, such as HDMI 1 to HDMI 2, HDMI 2 to HDMI 3, HDMI 3 to HDMI 1, etc.), and some may be bidirectional (e.g., a left or up input command may move from HDMI 1 to HDMI 4, while a right or down command may move from HDMI 1 to HDMI 2).

In one or more embodiments, the number of input commands needed to switch from a current media input to a requested media input may depend on the device model and what type of media input interface the device model uses, as determined by the scrolling input device 619. The scrolling input device 619 may instruct a media device to use the smallest number of input commands required to select a media input. For example, in a bidirectional input interface with media inputs HDMI 1-HDMI 4 and a "wrap-around" ability, to move from HDMI 1 to HDMI 4 may require only one input command to move backward from HDMI 1 to HDMI 4 rather than using three input commands to select HDMI 4. The scrolling input device 619 may instruct a media device to send a certain number of input commands, and in which direction. The media device or a remote control may determine the specific input codes (e.g., infrared codes) to send based on the number and direction of input commands.

In one or more embodiments, the scrolling input device 619 may become out of sync with the state of the television or receiver controlling media inputs. For example, the scrolling input device 619 may determine that the current media input used by the television or receiver is HDMI 1 when the television or receiver actually is using HDMI 2. The error may occur because a media device user manually selects a media device input (e.g., on the television or receiver, or with a remote control which does not result in sending a command to the remote network) without the scrolling input device 619 receiving an indication of the selection. Such may result in incorrect instructions provided by the scrolling input device 619 in response to voice commands requesting a switch to a particular media input. The scrolling input device 619 may identify an error, for example, when the scrolling input device 619 receives the same voice command or multiple voice commands specifying the same media input within a threshold amount of time (or repeat commands specifying the same media input). To rectify such state errors and get back in sync with the media devices of a media system, the scrolling input device 619 may send instructions to return to the main media input (e.g., using Consumer Electronics Code one touch play input), and may send additional instructions based on the number of input commands needed to switch from the main media input to the requested media input.

In one or more embodiments, the media state mapping may begin with the main media input. In this manner, the default or home state of the media system may be the main media input. When the scrolling input device 619 receives and responds to voice data of a voice command corresponding to a request to switch media inputs, the scrolling input device 619 may update the media state mapping with an indication of the number of media inputs that the television or receiver is at a given time from the main media input, and also may cause storage of the direction of the number of inputs from the main media input. In this manner, when the scrolling input device 619 receives a request corresponding to a media input switch from a first media input to a second media input, and neither of the first and second media inputs is the main media input, the scrolling input device 619 may determine the number of media input commands are needed to move from the first media input being active to activate the second media input. When an error is identified, however, the scrolling input device 619 may invalidate the media state mapping by indicating that the television or receiver is in an unknown state, and may update the media state mapping once the remote network confirms the media input currently selected at the television or receiver (e.g., the main media input). In an invalid state, the scrolling input device 619 may send instructions to cause presentation of a request for a media device user to select the main media input, or may request that the media device user provide an indication (e.g., a voice input, a button push, a selection of a media input, etc.) stating which media input is currently selected by the television or receiver. The scrolling input device 619 may set the media mapping state to the media input indicated by the media device user.

In one or more embodiments, when a media device sends a signal to the television or stereo through a respective media input (e.g., through a particular HDMI port), the signal may cause the television or stereo to select or activate the respective media input. To return the media device system to a known state (e.g., to a state corresponding to a selected media input recognized by the remote network), the scrolling input device 619 may send instructions to cause a media device (e.g., the streaming media device) to send a signal to the television or receiver through its respective media input to cause the television or receiver to select the respective media input. In this manner, the scrolling input device 619 may return the television or receiver to the main media input and may confirm when the main media input has been selected (e.g., based on a user confirmation or a signal received using the main media input), and then may update the state mapping.

In one or more embodiments, the scrolling input device 619 may maintain a state machine indicating which media devices are operatively connected to respective media inputs, and the number of media inputs for each respective media input from the main media input (e.g., a state mapping indicating which media devices are operatively connected to a respective media input). For example, HDMI 1 may be one input from HDMI 2, HDMI 3 may be two inputs from HDMI 1, and so on. When the scrolling input device 619 updates the state machine to reflect that a particular media input is selected, the current state may indicate the number of media inputs that the current state is from the main media input. In this manner, the scrolling input device 619 may identify a requested media input, determine a corresponding state of the state machine for the media input, determine the number of media inputs the corresponding state is from the main media input, determine the number of media inputs the current state of the state machine is from the main media input, and may determine the smallest number of input commands needed to switch from the current state to the corresponding state. The instructions sent by the scrolling input device 619 to switch media inputs may be based on such analysis of a state machine.

When the machine 600 is implemented in a streaming media device (e.g., the streaming media device 112 of FIG. 1A and FIG. 1B) or another device capable of receiving instructions from the scrolling input device 619, the machine 600 may determine the commands or command codes to send to cause activation of a media input at a media device. The machine 600 may determine the device to receive the commands or command codes, and may send command code instructions to another device, such as a remote control device, indicating that the device should send a certain number of particular command codes (e.g., infrared codes) to cause input activation. The machine 600 may send wireless signals indicative of the command codes, and/or may send CEC one touch play signals.

It is understood that the above are only a subset of what the scrolling input device 619 may be configured to perform and that other functions included throughout this disclosure may also be performed by the scrolling input device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

Figure 7:
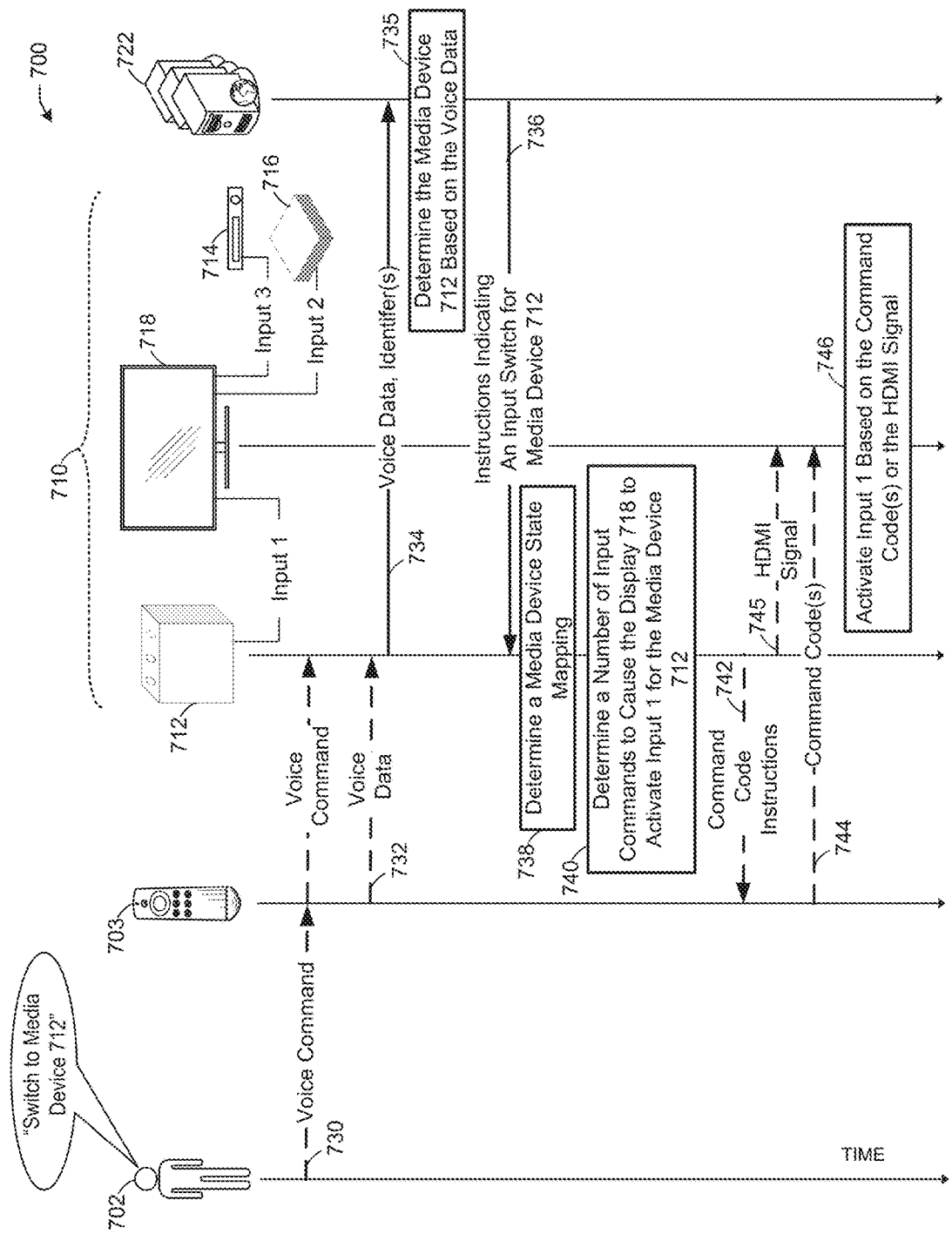
FIG. 7 illustrates an example process for automatic media device input scrolling, in accordance with one or more example embodiments of the present disclosure.

FIG. 7 illustrates an example process 700 for automatic media device input scrolling, in accordance with one or more example embodiments of the present disclosure.

Referring to FIG. 7, the process 700 may include a user 702, a remote control device 703, a media device system 710 (e.g., including one or more media devices such as a streaming media device 712, a cable box 714, a video game device 716, a display 718 (e.g., a television), and any combination of devices capable of receiving, providing, and/or rendering media content such as audio and/or video content), and one or more servers 722. At step 730, the user 702 may utter a voice command, such as "switch to media device 712" (e.g., referring to a particular media device, such as "switch to streaming media device," "switch to cable box," "switch to game console," "select cable box," "select streaming media device" etc.). Either the remote control device 703 or the streaming media device 712 may capture the audio command (e.g., with one or more microphones, not shown). At step 732, when the remote control device 703 captures the voice command at step 730, the remote control device 703 may send voice data (e.g., the recording of the voice command or a representation of the voice command) to another device, such as the streaming media device 712. At step 734, the other device (e.g., the streaming media device 712) may send the voice data and one or more identifiers (e.g., device and/or user identifiers) to the one or more servers 722 for analysis.

Still referring to FIG. 7, the one or more servers 722 (e.g., cloud-based computers) may determine, at step 735, that the voice data is related to the streaming media device 712. As shown, the voice command may include an utterance of the streaming media device 712, and the one or more servers 722 may identify the streaming media device 712 or any other device uttered in the voice command. When the one or more servers 722 identifies voice data that mentions a media device such as the streaming media device 712, the one or more servers 122 may determine that instructions indicating that an input corresponding to the streaming media device 712 at the display 718 (e.g., input 1) is to be activated. At step 736, the one or more servers 722 may send the instructions indicating an input switch is to occur for the corresponding input of the streaming media device 712 at the display 718. At step 738, the streaming media device 712 may receive the instructions and determine a media device state mapping for the media device system 710 with which the streaming media device 712 is associated. For example, the streaming media device 712 may have a state machine which indicates the media devices of the media device system 710, including which media devices are operatively connected to the display 718, and to which inputs (e.g., input 1, input 2, input 3, etc., which may refer to HDMI input ports, RCA input ports, VGA input ports, component input ports, or any other type of input ports). The streaming media device 712 may update the state mapping any time that an input changes in the media device system 110, and the state machine may indicate the number of inputs that a current (e.g., active) input and any other media device in the media device system 710 are from a main input (e.g., from input 1, corresponding to a main device such as the streaming media device 712). At step 740, the streaming media device 712 may determine a number of input commands needed to cause the display 718 to activate input 1 for the streaming media device 712 (e.g., when the voice command indicates a request to activate the input corresponding to the streaming media device 712 at the display 718). To determine the number of input commands, the streaming media device 712 may use the state mapping, which may indicate that a current state of the media device system 710 uses the current input (e.g., input 3 of the cable box 714), that the main input is input 1, that the difference between the main input and the requested input is zero (e.g., the main input and the requested input are input 1 for the streaming media device 712), that the difference between the current input and the main input is two (e.g., from input 3 to input 1 is two inputs), and that to switch to input 1 from input 3 requires two input commands based on the relative positions of the requested input and the current input from the main input.

Still referring to FIG. 7, at step 742, the streaming media device 712 may determine command code instructions corresponding to the number of command inputs. For example, the streaming media device 712 may determine and send instructions with the command codes (e.g., infrared or other signals) that the remote control device 703 may send to cause the display 718 to select the requested input corresponding to the voice command. The remote control device 703, at step 744, may send the command codes to the media device system 710 (e.g., to the display 718). When the voice data is indicative of a selection of the media input (e.g., input 1) corresponding to the streaming media device 712, rather than sending the command code instructions at step 742, the streaming media device 712 may, at step 745, send an HDMI signal (e.g., a Consumer Electronics Code one touch play input) to the display 718. A CEC one touch play code may be a signal sent through the input 1 port (e.g., an HDMI input port), and which indicates to the display 718 that input 1 is to be activated. At step 746, the display 718 may activate the input corresponding to the voice command (e.g., input 1 for the streaming media device 712).

In one or more embodiments, the remote control device 703, devices of the media device system 710, and/or the one or more servers 722 may include a personal computer (PC), a smart home device, a device with one or more speakers or other audio outputs, a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list. The one or more servers 722 may include a remote network (e.g., a cloud-based computer network of one or more physical or virtual computers), and may be accessible by the remote control device 703 and/or any devices of the media device system 710.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
    receiving, by one or more computer servers, first voice data and a device identifier;
    determining that the first voice data is indicative of a selection of a first high definition multimedia (HDMI) input of a first device;
    determining, based on the device identifier, a state mapping associated with the first device;
    determining, based on the state mapping, a second HDMI input of the first device, and an active input at the first device;
    determining, based on the state mapping, that the first HDMI input is a first number of inputs from the second HDMI input;
    determining that the active input is a second number of inputs from the second HDMI input;
    determining a first difference between the first number of inputs and the second number of inputs, wherein the first difference is associated with a first number of commands associated with causing the first device to activate the first HDMI input;
    determining a second difference between the first number of inputs and the second number of inputs, wherein the second difference is associated with a second number of commands associated with causing the first device to activate the first HDMI input;
    determining that the first number of commands is less than the second number of commands; and
    sending one or more instructions indicative of the first number of commands.

2. The method of claim 1, wherein the first voice data comprises an utterance of a second device, further comprising:
    identifying, based on the utterance, the second device; and
    determining, based on the state mapping and the second device, the first HDMI input.

3. The method of claim 1, wherein the first voice data comprises an indication of media content, further comprising identifying a second device based on the media content, wherein the second device is associated with the first HDMI input.

4. The method of claim 1, further comprising:
    receiving second voice data, wherein the second voice data is indicative of the selection;
    determining that the second voice data is received within a threshold amount of time after receiving the first voice data; and
    sending one or more instructions indicative of the second HDMI input.

5. A method, comprising:
    receiving, by one or more computer servers, voice data associated with a first device;
    determining, based on the voice data, an input of the first device;
    determining an active input of the first device;
    determining a number of inputs from the active input to the input; and
    sending one or more instructions based on the number of inputs.

6. The method of claim 5, further comprising:
    determining, based on the indicator, a second device; and
    determining, based on the second device, a state mapping associated with the first device, wherein determining the active input is based on the state mapping, and wherein determining the number of inputs is based on the state mapping.

7. The method of claim 5, wherein the number of inputs is a first number of inputs, and wherein the input is a first input, further comprising:
    determining that the active input is a second number of inputs from a second input of the first device;
    determining that the first input is a third number of inputs from the second input; and
    determining a difference between the second number of inputs and the third number of inputs, wherein determining the first number of inputs is based on the difference.

8. The method of claim 7, further comprising determining that the first device is associated with a unidirectional input selection, wherein determining that the first input is a third number of inputs from the second input is based on the unidirectional input selection.

9. The method of claim 7, wherein the difference is a first difference associated with causing the first device to activate the first input, further comprising:
- determining that the first device is associated with a multidirectional input selection;
- determining that the first input is a fourth number of inputs from the second input;
- determining a second difference between the first number of inputs and the fourth number of inputs, wherein the second difference is associated with causing the first device to activate the first input; and
- determining that the first difference is less than the second difference, wherein the first difference is associated with a first direction of the multidirectional input selection, and wherein the second difference is associated with a second direction of the multidirectional input selection.

10. The method of claim 5, wherein the voice data comprises an utterance associated with a second device, further comprising determining that the voice data is associated with an action, wherein the action is associated with the first device and the second device.

11. The method of claim 5, wherein the voice data comprises an indication of media content, further comprising determining a second device based on the media content, wherein the second device is associated with the first input.

12. The method of claim 5, wherein the voice data is first voice data, wherein the number of inputs is a first number of inputs, and wherein the input is a first input, further comprising:
- receiving second voice data;
- determining, based on the second voice data, that a third device is associated with a second input of the first device;
- determining that the first input is a second number of inputs from a third input of the first device;
- determining that the second input is a third number of inputs from the third input;
- determining a difference between the second number of inputs and the third number of inputs;
- determining a fourth number of inputs based on the difference; and
- sending one or more instructions based on the fourth number of inputs.

13. The method of claim 5, wherein the voice data is first voice data indicative of an action, further comprising:
- receiving second voice data, wherein the second voice data is indicative of the action;
- determining that the second voice data is received within a threshold amount of time after receiving the first voice data; and
- determining an error state associated with the first device.

14. The method of claim 13, further comprising:
- determining a second input of the first device;
- sending one or more instructions indicative of the second input; and
- receiving an indication that the second input has been activated at the first device.

15. The method of claim 14, wherein the one or more instructions indicative of the second input comprise a consumer electronics code one touch play command.

16. The method of claim 5, further comprising:
- receiving data indicative of a third device;
- determining a state mapping associated with the first device;
- determining that the state mapping fails to indicate the third device; and
- determining a second state mapping, wherein the second state mapping includes the third device.

17. A device, comprising at least one processor coupled to memory, the at least one processor configured to:
- receive voice data;
- send the voice data associated with a first device;
- receive a first instruction associated with an input of the first device;
- determine, based on the first instruction, an active input of the first device;
- determine a number of inputs from the active input to the input; and
- send a second instruction based on the number of inputs.

18. The device of claim 17, wherein the at least one processor is further configured to determine a state mapping associated with the first device, wherein to determine the active input is based on the state mapping, and wherein to determine the number of inputs is based on the state mapping.

19. The device of claim 17, wherein the number of inputs is a first number of inputs, wherein the input is a first input, and wherein the at least one processor is further configured to:
- determine that the active input is a second number of inputs from a second input of the first device;
- determine that the first input is a third number of inputs from the second input;
- determine a difference between the second number of inputs and the third number of inputs, wherein to determine the first number of inputs is based on the difference.

20. The device of claim 19, wherein the difference is a first difference associated with causing the first device to activate the first input, and wherein the at least one processor is further configured to:
- determine that the first device is associated with a multidirectional input selection;
- determine that the first input is a fourth number of inputs from the second input;
- determine a second difference between the first number of inputs and the fourth number of inputs, wherein the second difference is associated with causing the first device to activate the first input; and
- determine that the first difference is less than the second difference, wherein the first difference is associated with a first direction of the multidirectional input selection, and wherein the second difference is associated with a second direction of the multidirectional input selection.

* * * * *